United States Patent
Hanada et al.

(10) Patent No.: US 6,171,663 B1
(45) Date of Patent: *Jan. 9, 2001

(54) LIQUID CRYSTAL DISPLAY ELEMENT WITH A TRANSPARENT ELECTRODE SUBSTRATE, AND THE TRANSPARENT ELECTRODE SUBSTRATE

(75) Inventors: Toru Hanada; Kazuo Yahata; Yuji Tamura, all of Hino (JP)

(73) Assignee: Teijin Limited, Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/829,899

(22) Filed: Mar. 25, 1997

(30) Foreign Application Priority Data

| Mar. 25, 1996 | (JP) | 8-068135 |
| Apr. 25, 1996 | (JP) | 8-105142 |
| Aug. 9, 1996 | (JP) | 8-211075 |

(51) Int. Cl.[7] .................................................. G02F 1/1343
(52) U.S. Cl. .............................. 428/1; 349/139; 428/447; 524/588; 525/100
(58) Field of Search .................................. 349/139; 428/1, 428/447; 524/588; 525/100

(56) References Cited

FOREIGN PATENT DOCUMENTS

| 0 649 047 A1 | 4/1995 | (EP). |
| 0 726 579 A2 | 8/1996 | (EP). |
| 5-185568 | 7/1993 | (JP) .............................. B32B/27/00 |
| 6-175143 | 6/1994 | (JP) .............................. G02F/1/1343 |
| 7-164591 | 6/1995 | (JP) .............................. B32B/9/00 |
| 7-168166 | 7/1995 | (JP) .............................. G02F/1/1333 |
| 8-99390 | 4/1996 | (JP) .............................. B32B/27/28 |
| 8-309913 | 11/1996 | (JP) .............................. B32B/9/00 |
| WO 95 16936 | 6/1995 | (WO). |

OTHER PUBLICATIONS

Patent Abstracts of Japan, No. 60192915, Oct. 1, 1985.

Patent Abstracts of Japan, No. 60178424, Sep. 12, 1985.

*Primary Examiner*—Alexander Thomas
(74) *Attorney, Agent, or Firm*—Sughrue, Mion, Zinn, Macpeak & Seas, PLLC

(57) ABSTRACT

A liquid crystal display element having at least one electrode substrate comprising A) a metal oxide layer, B) a cured polymer layer contiguous to said metal oxide layer and obtained from cross-linking reaction of: B1) a silicon compound having epoxy and alkoxysilyl groups, a hydrolysis or condensation product thereof; B2) a silicon compound having amino and alkoxysilyl groups, a hydrolysis or condensation product thereof; and B3) a polyvinyl alcohol-based polymer; C) a transparent electroconductive layer; and D) a transparent polymer substrate. A transparent electrode substrate comprising a substrate (D), a metal oxide layer (A) and said cured polymer layer (B) is also provided.

42 Claims, 9 Drawing Sheets

↓ COATING

↓ CURING

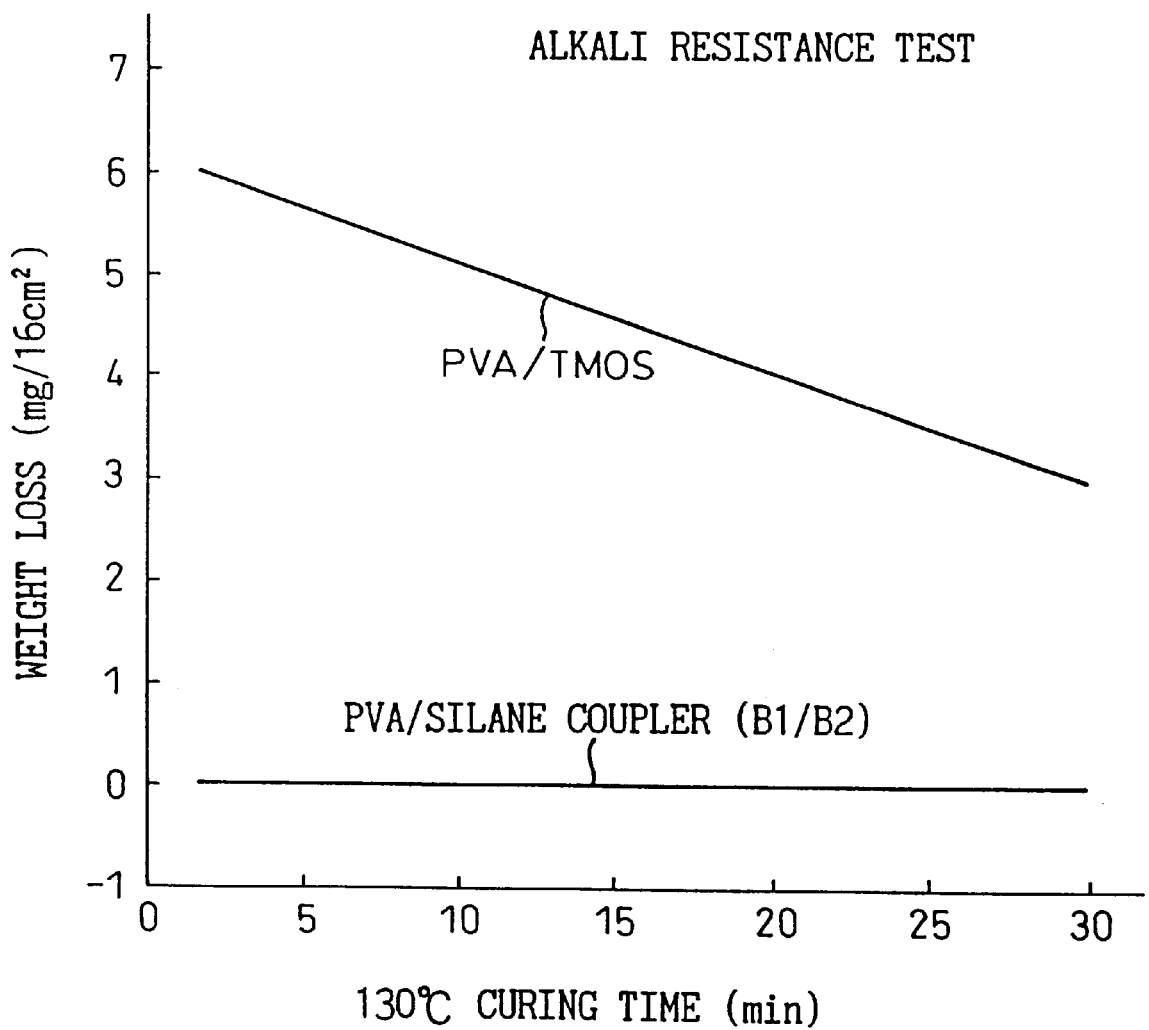

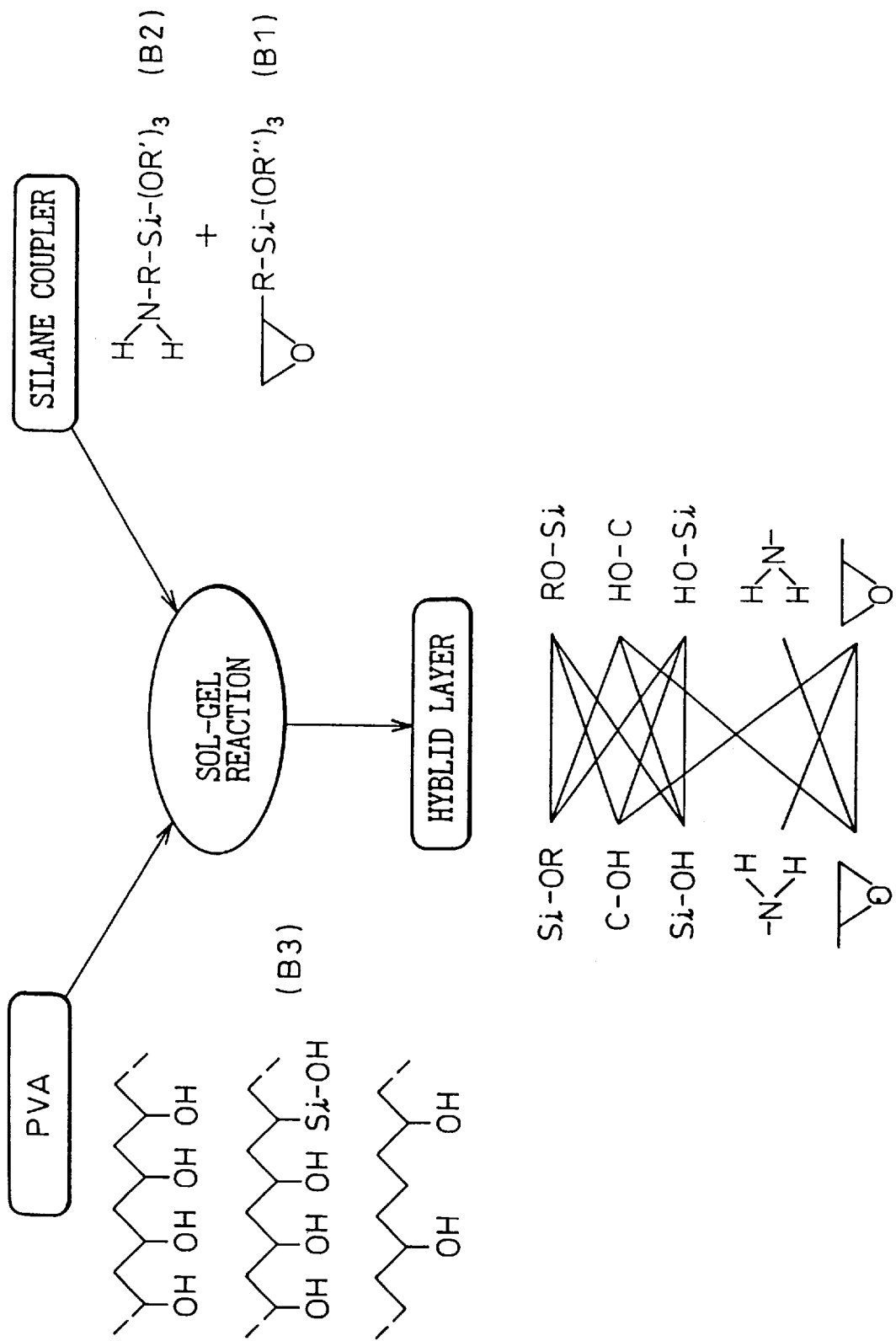

LIQUID CRYSTAL DISPLAY ELEMENT WITH A TRANSPARENT ELECTRODE SUBSTRATE, AND THE TRANSPARENT ELECTRODE SUBSTRATE

BACKGROUND OF THE INVENTION

1. Field of the Invention

The present invention relates to a liquid crystal display element having a transparent electrode substrate excellent in optical isotropy, smoothness, durability, chemical or solvent resistance, water moisture barrier properties, gas barrier properties, flexibility and so on. The present invention also relates to such a transparent electrode substrate, which is suitable not only for a liquid crystal display (LCD) element, but also for a touch panel, a photosensitive conductor, a planar phosphor, an organic electroluminescence element or the like.

2. Description of the Related Art

Recently, portable information apparatus such as a pager, a portable telephone, an electronic notebook and a portable information terminal have become popular and the business and the life style are going to be dorastically changed. To improve the portability of the information apparatus, it is demanded to make the information apparatus thinner, lighter and more durable.

Conventionally, a glass substrate which is heavy, thick and fragile has been used for a transparent electroconductive substrate of an LCD element or a touch panel. As an alternate material, a transparent resin substrate has been proposed, and the transparent resin substrate is advantageous in decreasing cost for manufacturing an LCD and the like since it can be processed in a roll-to-roll system. However, the transparent resin substrate is inferior to the glass substrate in durability, chemical or solvent resistance, gas barrier properties and other basic properties.

For example, in the case of a transparent resin substrate used as an electrode for a LCD element, the gas barrier property can be improved by providing a metal oxide layer to the transparent resin substrate. However, there are problems that in the step of removing a resist after patterning the transparent electrode, the metal oxide layer contacts an alkali solution by which the metal oxide layer is dissolved, and in the step of forming a liquid crystal alignment layer, a coating composition for the liquid crystal alignment layer containing N-methylpyrolidone or other solvent is used and the transparent resin substrate in contact with the solvent is damaged or, for example, becomes white or swollen.

To solve the above problems, there are some proposals of laminating a layer having a gas barrier property and a chemical resistance onto the transparent resin substrate. For example, Japanese Examined Patent Publication (Kokoku) Nos. 5-52002 and 5-52003 propose a transparent substrate comprising a polymer film and an oxygen gas barrier layer made of polyvinyl alcohol which has an improved adhesivity and further has a moisture barrier property. However, the polyvinyl alcohol-based polymer layer disposed as the outermost layer does not have a sufficient chemical resistance and therefore causes problems during manufacturing a liquid crystal cell. The chemical resistance may be given by additionally providing a chemical resistant layer, which however increases the cost.

Japanese Unexamined Patent Publication (Kokai) Nos. 2-137922 and 5-309794 propose a transparent substrate comprising a transparent polymer film, an anchor layer, a gas barrier layer made of ethylene-vinyl alcohol copolymer and a solvent-resistant layer in this order as a stack. In this transparent substrate, the solvent-resistance is satisfactory but the gas barrier property at a high humidity is lowered due to the property of the material of the gas barrier layer, and the structure of the six layers increases manufacturing cost.

Further, in a transparent substrate of a liquid crystal display element, the following demands on and problems of the properties exist in addition to the above chemical resistance and gas barrier properties.

If the substrate is low in its transparency or has a birefrigence, the coloring of the display and lowering of contrast occur.

If the surface smoothness of the substrate is low, the gap for a liquid crystal layer becomes non-uniform and the liquid crystal orientation may be disordered or the substrate may become optically non-uniform. As a result, the displaying color becomes non-uniform.

Moreover, if the smoothness, transparency, and gas barrier properties of the substrate are deteriorated by mechanical or thermal influence or by contact with a solvent, the advantages of the lightness, the wide range of the freedom of shape and the possibility of a curved display can not be obtained in applications to a pager, a portable telephone, an electronic notebook, a pen-input apparatus and so on since they receive substantial outer mechanical or thermal influences. In particular, considering the resistance to the mechanical influence, excellent adhesion between the layers is required to maintain the above advantageous properties.

The object of the present invention is to provide a liquid crystal display element having a transparent resin substrate which is excellent in the chemical or solvent resistance, gas barrier properties, transparency, smoothness, adhesivity and so on as mentioned above and which has a small number of laminated layers and thus is low in manufacturing cost.

SUMMARY OF THE INVENTION

The above and other objects and the features of the present invention are attained by providing:

(I) A liquid crystal display element comprising two electrode substrates between which a liquid crystal layer is disposed, at least one of said electrode substrates comprising the following components:
  A) a metal oxide layer,
  B) a cured polymer layer contiguous to said metal oxide layer, said cured polymer layer being obtained from a cross-linking reaction of:
    B1) a silicon compound having epoxy and alkoxysilyl groups, a full or partial hydrolysis product thereof, a full or partial condensation product thereof, or a mixture thereof:
    B2) a silicon compound having amino and alkoxysilyl groups, a full or partial hydrolysis product thereof, a full or partial condensation product thereof, or a mixture thereof; and
    B3) a polyvinyl alcohol-based polymer;
  C) a transparent electroconductive layer; and
  D) a transparent polymer substrate with a retardation of not more than 30 nm for a wavelength of 590 nm;
    wherein said transparent electroconductive layer (C) is formed on the liquid crystal layer side of said transparent polymer substrate (D), and said combination of said metal oxide layer (A) and said cured polymer layer (B) is disposed between said transparent electroconductive layer (C) and said transparent polymer substrate D) or is disposed on a side opposite to the transparent electroconductive layer (C) of said transparent polymer substrate (D).

(II) A liquid crystal display element comprising two electrode substrates between which a liquid crystal layer is disposed, at least one of said electrode substrates comprising the following components:
A) a metal oxide layer,
B) a cured polymer layer contiguous to said metal oxide layer,
C) a transparent electroconductive layer, and
D) a transparent polymer substrate with a retardation of not more than 30 nm for a wavelength of 590 nm, wherein said transparent electroconductive layer (C) is formed on the liquid crystal layer side of said transparent polymer substrate (D), and said combination of said metal oxide layer (A) and said cured polymer layer (B) is disposed between said transparent electroconductive layer (C) and said transparent polymer substrate (D) or is disposed on a side opposite to the transparent electroconductive layer (C) of said transparent polymer substrate (D),
said cured polymer layer comprising a polyvinyl alcohol-based polymer cross-linked with a unit represented by the following formula (3):

$$—O—Si—(C_pH_{2p})—^{*1}A^{*2}\,{}^{*3}B^{*4}—(C_qH_{2q})—Si—O— \quad (3)$$

where p is an integer of 0 to 5,
q is an integer of 0 to 5;
A stands for $$^{*1}{+}O{+}_l—\underset{|}{\overset{R^7}{C}H}—\underset{\underset{|}{O}}{\overset{R^8}{C}H}—CH—^{*2},\quad ^{*1}\!\!\!-\!\!\bigcirc\!\!\!\underset{|}{\overset{}{O}}\!\!\!-\!\!^{*2}$$

where $R^7$ and $R^8$ are independently hydrogen, methyl, ethyl or phenyl, and l is 0 or 1;
B stands for $$—\overset{*3}{N}—(CH_2)_r{\!}_s\!\!—\overset{*4}{N}—$$

where r is an integer of 0 to 5, and s is an integer of 0 to 2; and
*2 and *3 are sites bonded each other.

(III) A transparent electrode substrate comprising the following components:
A) a metal oxide layer,
B) a cured polymer layer contiguous to said metal oxide layer, said cured polymer layer being obtained from cross-linking reaction of:
B1) a silicon compound having epoxy and alkoxysilyl groups, a full or partial hydrolysis product thereof, a full or partial condensation product thereof, or a mixture thereof;
B2) a silicon compound having amino and alkoxysilyl groups, a full or partial hydrolysis product thereof, a full or partial condensation product thereof, or a mixture thereof; and
B3) a polyvinyl alcohol-based polymer; and
C) a transparent electroconductive layer; and
D) a transparent polymer substrate with a retardation of not more than 30 nm for a wavelength of 590 nm; wherein said combination of said metal oxide layer (A) and said cured polymer layer (B) is disposed between said transparent electroconductive layer (C) and said transparent polymer substrate (D) or is disposed on a side opposite to the transparent electroconductive layer (C) of said transparent polymer substrate (D).

(IV) A transparent electrode substrate comprising the following components:
A) a metal oxide layer,
B) a cured polymer layer contiguous to said metal oxide layer,
C) a transparent electroconductive layer, and
D) a transparent polymer substrate with a retardation of not more than 30 nm for a wavelength of 590 nm, wherein said combination of said metal oxide layer (A) and said cured polymer layer (B) is disposed between said transparent electroconductive layer (C) and said transparent polymer substrate (D) or is disposed on a side opposite to the transparent electroconductive layer (C) of said transparent polymer substrate (D),
said cured polymer layer comprising a polyvinyl alcohol-based polymer cross-linked with a unit represented by the following formula (3):

$$—O—Si—(C_pH_{2p})—^{*1}A^{*2}—^{*3}B^{*4}—(C_qH_{2q})—Si—O— \quad (3)$$

where p is an integer of 0 to 5,
q is an integer of 0 to 5;
A stands for $$^{*1}{+}O{+}_l—\underset{|}{\overset{R^7}{C}H}—\underset{\underset{|}{O}}{\overset{R^8}{C}H}—CH—^{*2},\quad ^{*1}\!\!\!-\!\!\bigcirc\!\!\!\underset{|}{\overset{}{O}}\!\!\!-\!\!^{*2}$$

where $R^7$ and $R^8$ are independently hydrogen, methyl, ethyl or phenyl, and l is 0 or 1;
B stands for $$—\overset{*3}{N}—(CH_2)_r{\!}_s\!\!—\overset{*4}{N}—$$

where r is an integer of 0 to 5, and s is an integer of 0 to 2; and
*2 and *3 are sites bonded each other.

(V) An article comprising:
D) a substrate; and
B) a cured polymer layer formed on a surface of said substrate, said cured polymer layer being obtained from cross-linking reaction of:
B1) a silicon compound having epoxy and alkoxysilyl groups, a full or partial hydrolysis product thereof, a full or partial condensation product thereof or a mixture thereof;

B2) a silicon compound having amino and alkoxysilyl groups, a full or partial hydrolysis product thereof, a full or partial condensation product thereof or a mixture thereof; and
B3) a polyvinyl alcohol-based polymer.
(VI) A process for producing a coated article, comprising the steps of:
a) preparing a coating composition which comprises:
B1) a silicon compound having epoxy and alkoxysilyl groups, a full or partial hydrolysis product thereof, a full or partial condensation product thereof or a mixture thereof;
B2) a silicon compound having amino and alkoxysilyl groups, a full or partial hydrolysis product thereof, a full or partial condensation product thereof or a mixture thereof;
B3) a polyvinyl alcohol-based polymer;
B4) a carboxylic acid;
B5) an organic solvent; and
B6) water;
b) coating a substrate with said coating composition; and
c) curing said coating composition by cross-linking reaction between said compounds (B1) to (B3) to form a cured polymer layer on said substrate.
(VII) A coating composition which comprises:
B1) a silicon compound having epoxy and alkoxysilyl groups, a full or partial hydrolysis product thereof, a full or partial condensation product thereof or a mixture thereof;
B2) a silicon compound having amino and alkoxysilyl groups, a full or partial hydrolysis product thereof, a full or partial condensation product thereof or a mixture thereof;
B3) a polyvinyl alcohol-based polymer;
B4) a carboxylic acid;
B5) an organic solvent; and
B6) water.

BRIEF DESCRIPTIONS OF DRAWINGS

Figure 3:
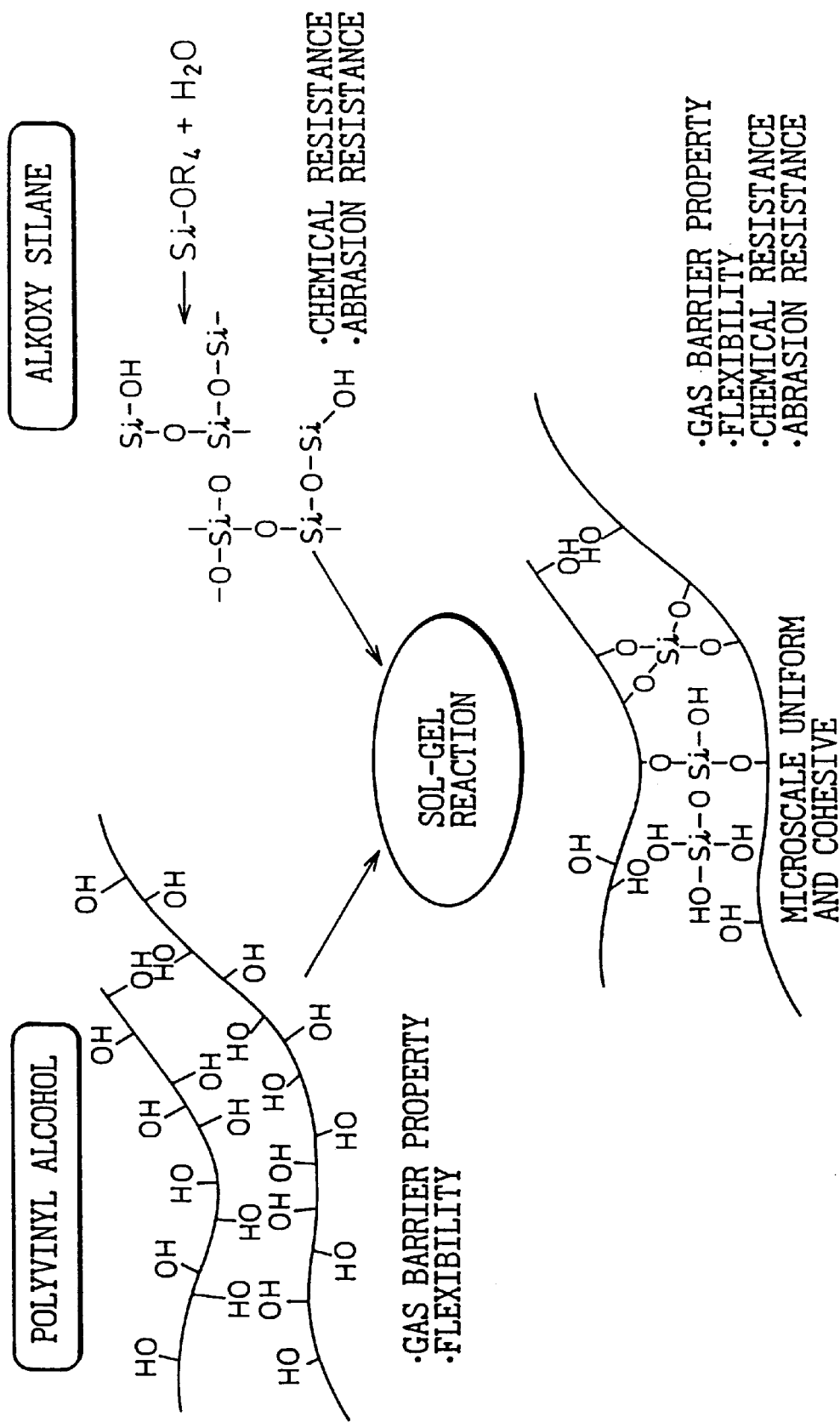
Figure 4A:
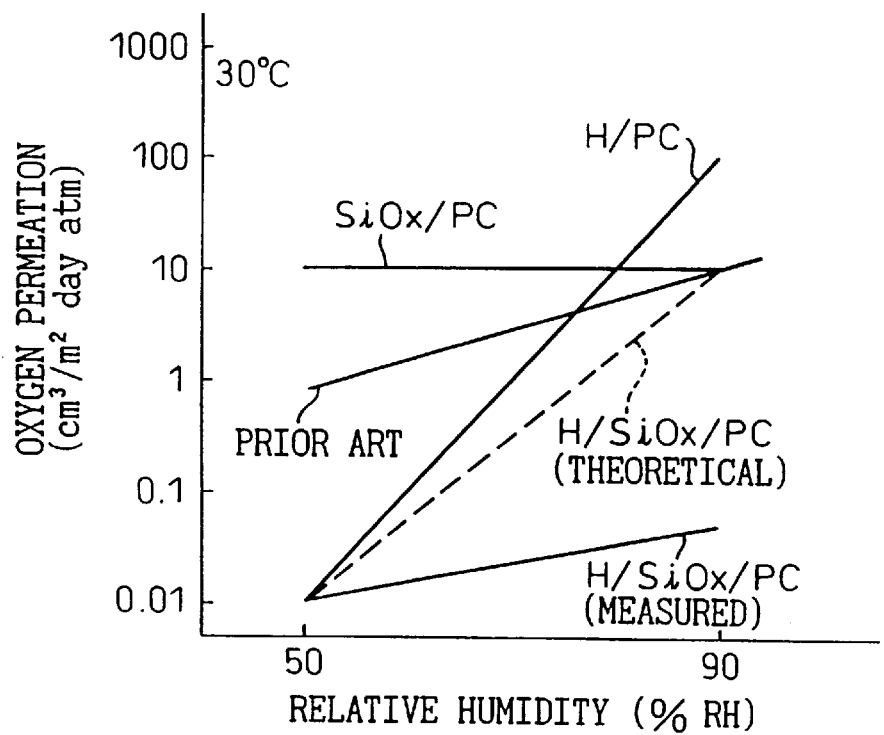
Figure 4B:
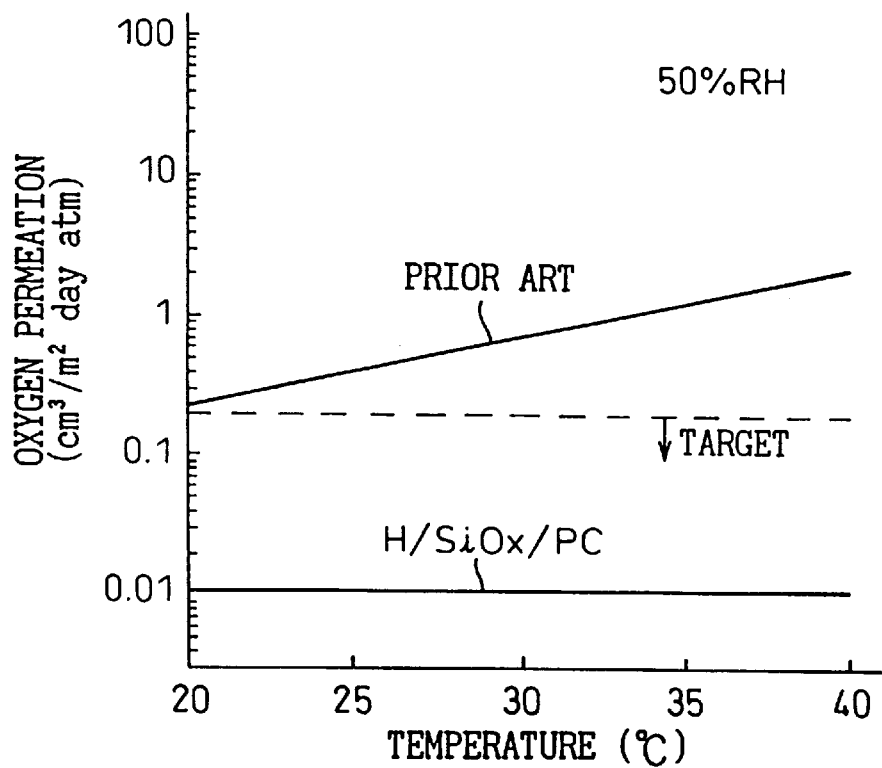
Figure 5:
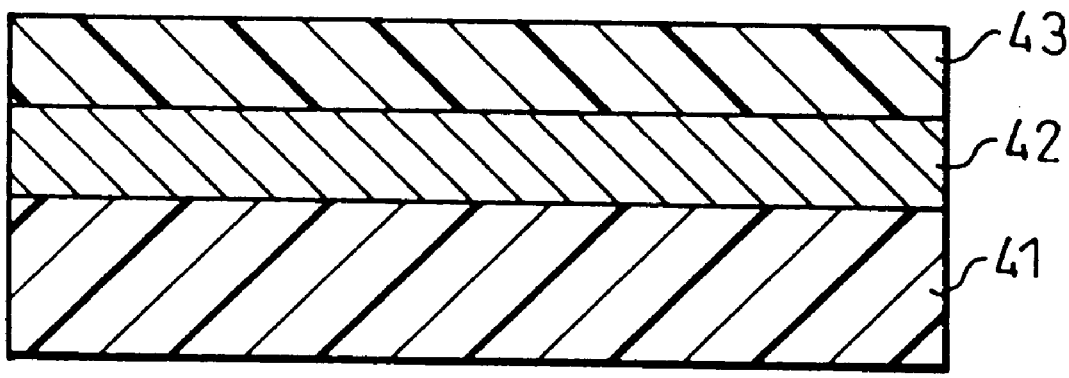
Figure 6A:
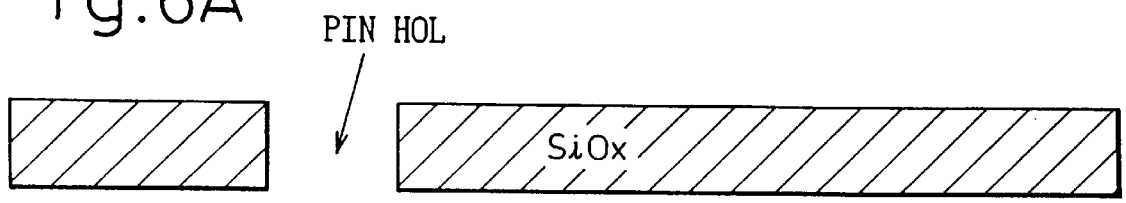
Figure 6B:
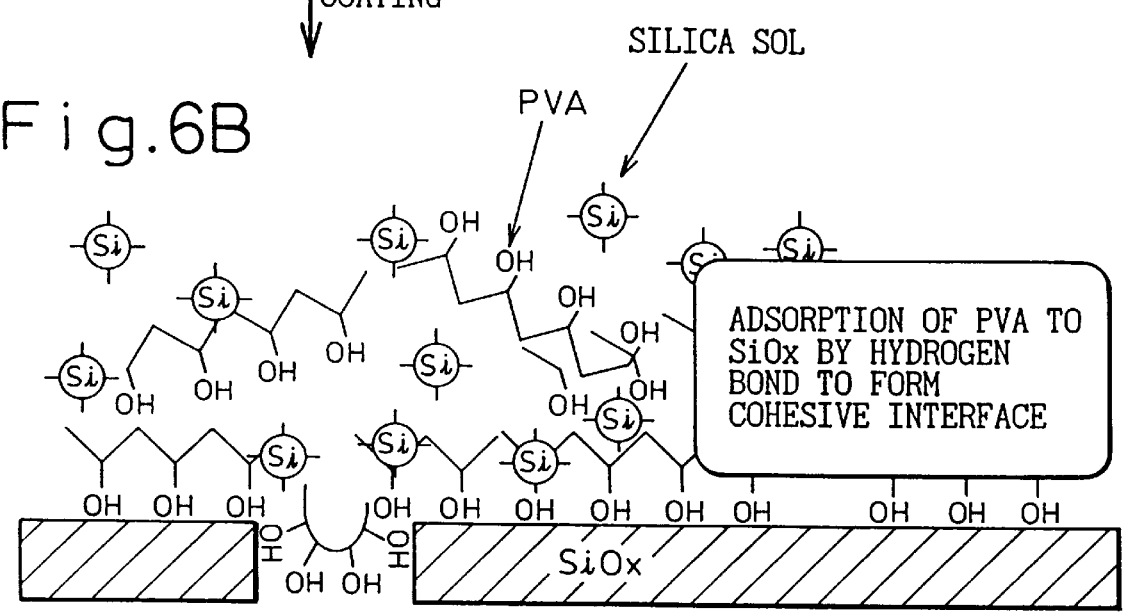
Figure 6C:
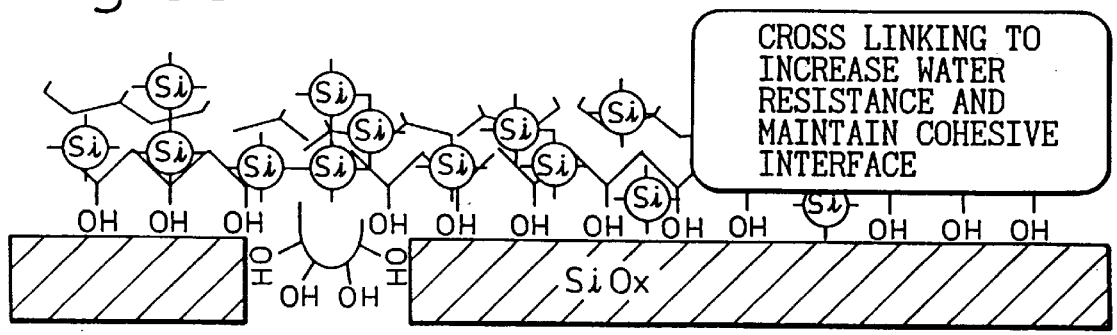
Figure 9:
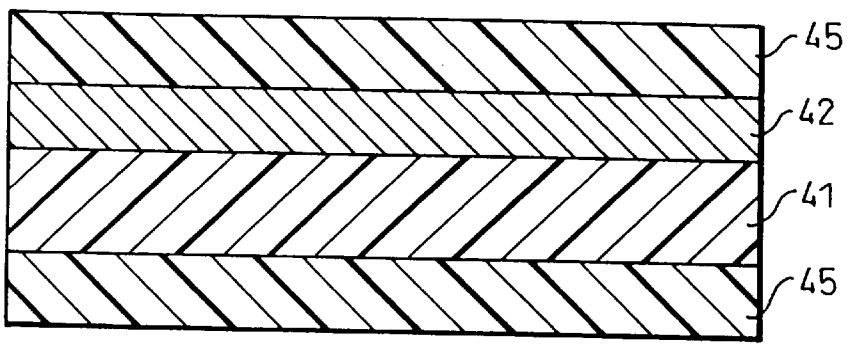
Figure 10A:
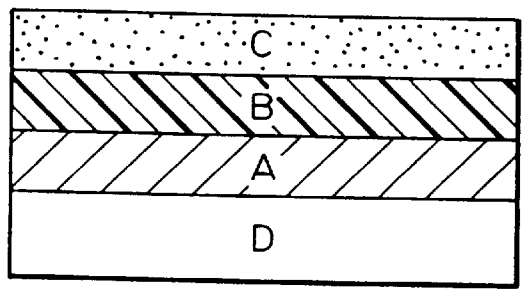
Figure 10B:
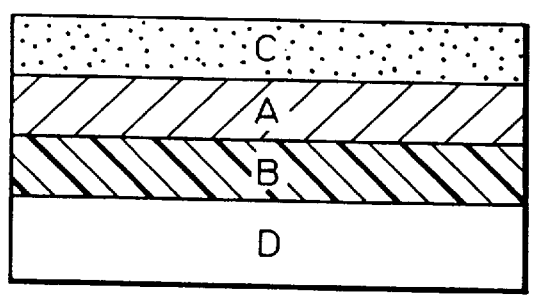
Figure 10C:
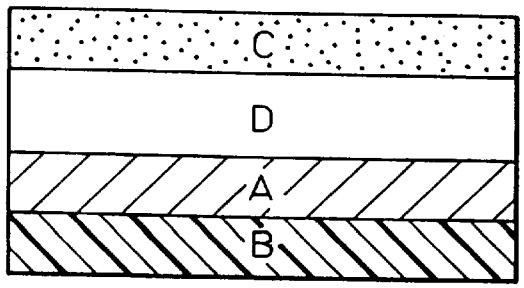
Figure 10D:
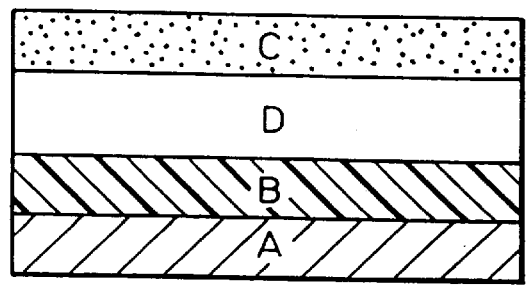
Figure 11A:
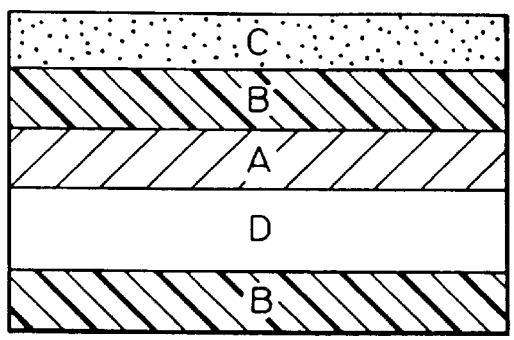
Figure 11B:
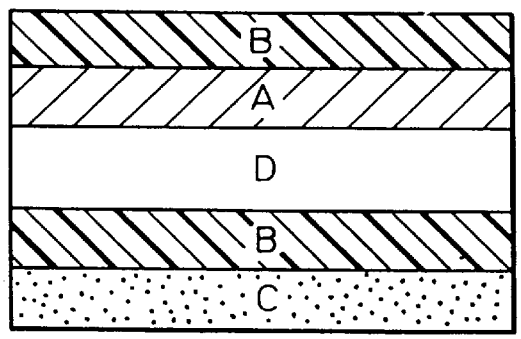
Figure 11C:
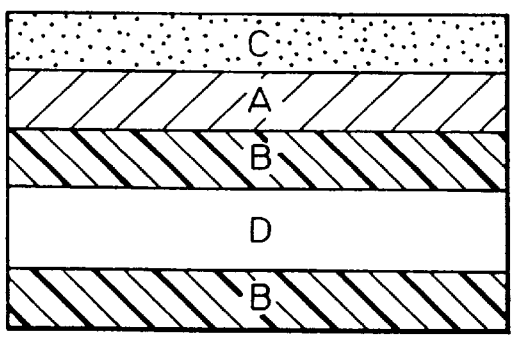
Figure 11D:
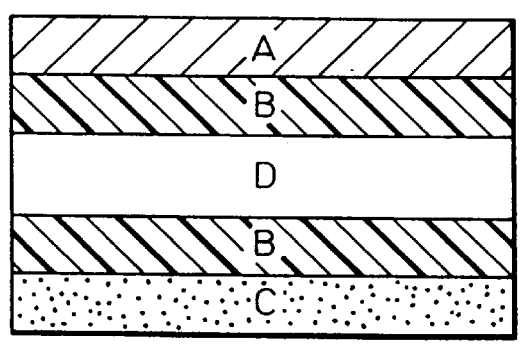
Figure 11E:
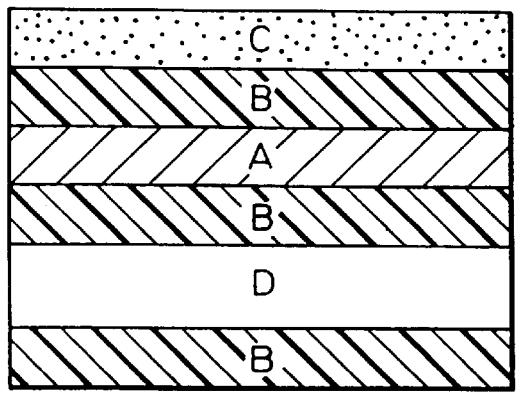
Figure 11F:
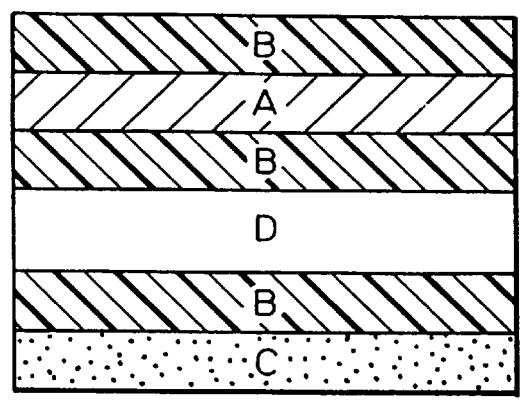

FIG. 3 schematically shows the reaction of a hybrid of a polyvinyl alcohol-based polymer with an alkoxysilane;

FIGS. 4A and 4B show the oxygen permeation property of gas barrier layers;

FIG. 5 is a cross-sectional view of a lamination of a gas barrier layer of a hybrid and $SiO_x$ layers with a polycarbonate film;

FIGS. 6A to 6C show the combined effect of the hybrid and $SiO_x$ layers;

FIG. 7 shows the alkali resistance of hybrid layers;

FIG. 8 schematically shows the reactions between the compounds (B1) to (B3);

FIG. 9 shows a cross section of an ideal transparent polymer substrate in accordance with the present invention;

FIGS. 10A to 10D and 11A to 11F show various arrangements of the components (A) to (D) of the present invention.

DESCRIPTION OF THE PREFERRED EMBODIMENTS

Liquid Crystal Display Element

The liquid crystal display element is a display element in which a liquid crystal material is sealed between two substrates having an electrode pattern and an voltages are applied between the electrodes so as to electro-optically modulate the liquid crystal material and make a display such as of letters and images. The substrate of the liquid crystal display element is conventionally an inorganic glass but a liquid crystal display element using a plastic substrate is attracting attention from the viewpoints of making the element thinner and lighter, allowing a curved display, providing strength, and reducing production cost.

Figure 1:
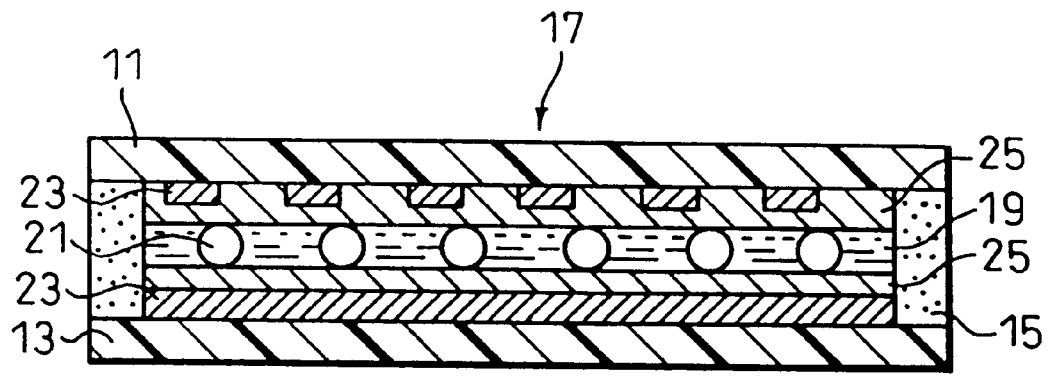
FIG. 1 is a cross-sectional view of an example of a liquid crystal display element.

FIG. 1 is an illustration of an example of a liquid crystal display element, in which an upper substrate 11 and a lower substrate 13 are disposed to face each other, the peripheries of the substrates 11 and 13 are sealed with a sealing material 15, a gapping material 21 is dispersed between the substrates 11 and 13, and a liquid crystal cell 17 is thus formed, in which a liquid crystal material 19 is filled. Polarizing plates are provided sandwiching the cell 17 to form a TN-type liquid crystal display element, although the present invention is not limited to this type of the liquid crystal display element.

Each of the upper and lower substrates 11 and 13 has, on the inner side, a transparent electroconductive layer 23 and an aligning layer thereon.

Figure 2:
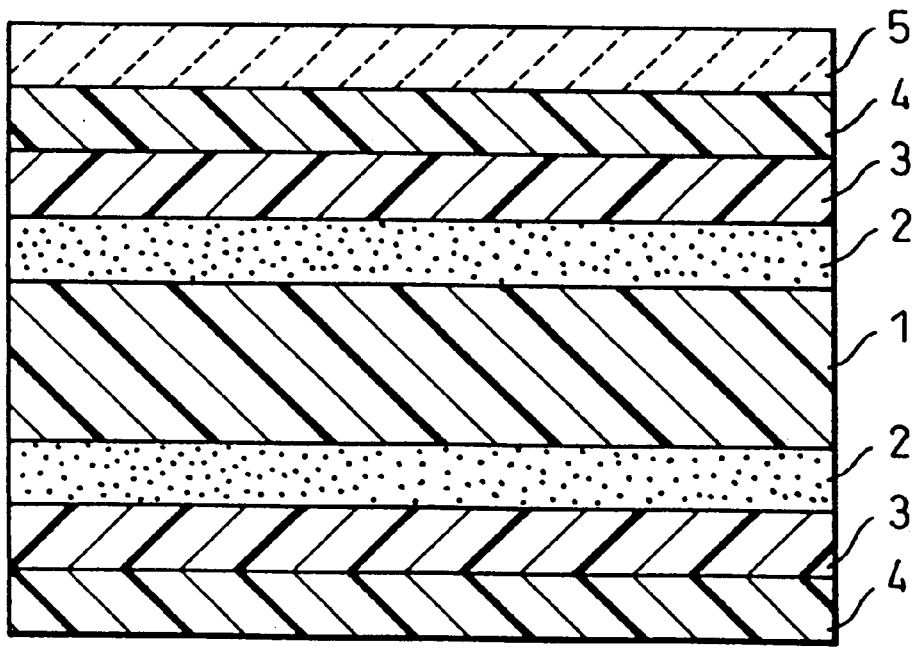
FIG. 2 shows a cross-sectional view of a commercially available transparent polymer electrode substrate.

FIG. 2 shows a cross-section of a transparent polymer electrode substrate which is commercially available. The transparent polymer electrode substrate comprises a polycarbonate film 1, anchor layers 2, gas barrier layers of an ethylene-vinyl alcohol copolymer 3, solvent-resistant layers 4 and a transparent electroconductive layer of ITO 4. The polycarbonate film 1 is about 100 μmthick and the other layers 2 to 4 are a few μm thick.

The liquid crystal display element of the present invention comprises two electrode substrates, at least one of which comprises a metal oxide layer (A), a cured polymer layer (B), a transparent electroconductive layer (C) and a transparent polymer substrate (D).

Transparent Polymer Substrate (D)

The transparent polymer substrate (D) used in the present invention is not particularly limited as long as it has an optical isotropy or a retardation of not more than 30 nm for a wavelength of 590 nm. The retardation is represented by a product $\Delta n \cdot d$ where $\Delta n$ stands for a difference between the refractions of a birefrigence for a wavelength of 590 nm which can be measured by a conventional device and d stands for a thickness of the substrate. If the retardation is more than 30 nm, coloring and viewangle problems appear. Preferably the retardation is not more than 20 nm. The dispersion of the retardation phase axis is preferably within ±30°, more preferably within ±15°.

The materials which can satisfy the above requirements include polyester-based resins, polycarbonate-based resins, polyarylate-based resins, polysulfone-based resins such as polysulfone, polyethersulfone and polyallylsulfone, polyolefin-based resins, acetate-based resins such as cellulose triacetate, polystylene-based resins, acrylic resins, and various thermosetting resins. Among them, a transparent polymer substrate comprising a polycarbonate-based resin as a main component is most preferred from the viewpoints of a high optical transparency and a low optical anisotropy.

The thickness of the transparent polymer substrate is usually between 30 μm and 800 μm.

Metal Oxide Layer (A)

The metal oxide layer (A) used in the present invention may be of an insulating metal oxide such as oxides of silicon, aluminum, magnesium and zinc. The transparent insulating metal oxide layer may be deposited by known spattering, evaporation, ion plating, plasma enhanced CVD, and so on. Silicon oxide is particularly preferred as a metal oxide for a water moisture barrier layer from the viewpoints of transparency, surface smoothness or evenness, flexibility, layer stress, cost, etc.

The composition of silicon oxide may be analyzed and determined by X-ray photoelectron spectroscopic analyzer, X-ray microspectroscopic analyzer, Auger electron analyzer, Rutherford back scattering, etc. Silicon oxide having an average composition represented by $SiO_x$ where $1.5 \leq x \leq 2$ is preferred for its visible light permeation and flexibility. If the value of x is less than 1.5, the flexibility and the transparency are lowered. The silicon oxide having an average composition represented by $SiO_x$ where $1.5 \leq x \leq 2$ may further comprises other metals such as magnesium, iron, nickel, chromium, titanium, aluminum, indium, zinc, tin, antimony, tungsten, molybdenum, copper. The silicon oxide further may contain fluoride or carbon to increase flexibility. The amount of such additives is not more than 30% by weight.

The thickness of the metal oxide layer is preferably between 2 nm and 200 nm. If the thickness of the layer is less than 2 ml, it is difficult to form a uniform layer and the layer formed may have pores from where gas permeates the substrate, reducing the gas barrier properties. If the thickness is more than 200 nm, the transparency of the layer is lowered and the flexibility becomes poor causing cracks, thus reducing the gas barrier properties.

Cured Polymer Layer (B)

The cured polymer layers (B) used in the present invention is formed by cross-linking reaction of the components:
B1) a silicon compound having epoxy and alkoxysilyl groups, a full or partial hydrolysis product thereof, a full or partial condensation product thereof, or a mixture thereof;
B2) a silicon compound having amino and alkoxysilyl groups, a full or partial hydrolysis product thereof, a full or partial condensation product thereof, or a mixture thereof; and
B3) a polyvinyl alcohol-based polymer.

The cured polymer layer B) is formed in contiguous to or in contact with the metal oxide layer.

The component compounds (B1) to (B3) are described below:

Polyvinyl Alcohol-Based Polymer (B3)

The polyvinyl alcohol-based polymer (B3) of the present invention may be a known one and is commercially available. The polyvinyl alcohol-based polymer B3) preferably comprises not less than 50% by mole of a polyvinyl alcohol component and/or a polyvinyl alcohol-copolymer component.

Examples of polyvinyl alcohol-copolymers include vinyl alcohol-vinyl acetate copolymer, vinyl alcohol-vinyl butylal copolymer, ethylene-vinyl alcohol copolymer, and vinyl alcohol-based alcohol having silyl groups in its molecule.

Generally, a polyvinyl alcohol-based polymer selected from polyvinyl alcohol having a degree of saponification of not less than 80%, ethylene-vinyl alcohol copolymer ard polyvinyl alcohol-based polymer having silyl groups in its molecule is preferred.

The ethylene content in the ethylene-vinyl alcohol copolymer is preferably not more than 50%. If the ethylene content is more than 50%, a desired gas barrier property of the cured polymer layer can not be obtained.

The polyvinyl alcohol-based polymer having silyl groups in its molecule is one having a reactive silyl group represented by the following formula (4):

(4)

where $R^{11}$ stands for hydrogen, alkyl having 1 to 10 carbon atoms, acyl, an alkali metal or an alkali earth metal, $R^{12}$ stands for alkyl having 1 to 10 carbon atoms, and r is an integer of 1 to 3.

The silyl group in the molecule may be a terminal group of the polyvinyl alcohol-based polymer. The site, distribution, etc. of the silyl group in the molecule are not limited as long as the silyl group is bonded to the polyvinyl alcohol-based polymer through a non-hydrolyzable bond. The content of silyl is preferably not more than 5% by mole, more preferably not more than 1% by molar. If the silyl content is too high, the coating composition becomes disadvantageously viscous and tends to be geled.

The polymerization degree and saponification degree of the polyvinyl alcohol-based polymer of the present invention are not particularly limited but the average polymerization degree is preferably between 100 and 5000 and the saponification degree is preferably not less than 70%, more preferably not less than 80%. If the polymerization degree is too low, the coated layer is brittle. If polymerization degree is too high, the coating solution becomes too viscous and coating is difficult. If the saponification degree is too low, a sufficient gas barrier property is not obtained.

Silicon Compound Havina Epoxy And Alkoxysilyl Groups (B1)

The compound (B1) of the present invention is a silicon compound having epoxy and alkoxysilyl groups, a full or partial hydrolysis product thereof, a full or partial condensation product thereof, or a mixture thereof. A preferable silicon compound having epoxy and alkoxysilyl groups is represented by the following formula (1):

(1)

where $R^1$ is alkylene having 1 to 4 carbon atoms,
$R^2$ and $R^3$ are independently alkyl having 1 to 4 carbon atoms,
X is glycidoxy or epoxycyclohexyl, and
n is 0 or 1.

Examples of the above silicon compound having epoxy and alkoxysilyl groups (B1) include
glycidoxymethyltrimethoxysilane,
glycidoxymethyltriethoxysilane,
glycidoxymethyltripropoxysilane,
glycidoxymethyltributoxysilane,
2-glycidoxyethyltrimethoxysilane,
2-glycidoxyethyltriethoxysilane,
2-glycidoxyethyltripropoxysilane,
2-glycidoxymethyltributoxysilane,
1-glycidoxyethyltrimethoxysilane,
1-glycidoxyethyltriethoxysilane,
1-glycidoxyethyltripropoxysilane, 1-glycidoxymethyltributoxysilane,
3-glycidoxypropyltrimethoxysilane,
3-glycidoxypropyltriethoxysilane,
3-glycidoxypropyltripropoxysilane,
3-glycidoxypropyltributoxysilane,
1-glycidoxypropyltrimethoxysilane,
1-glycidoxypropyltriethoxysilane,
1-glycidoxypropyltripropoxysilane,
1-glycidoxypropyltributoxysilane, (3,4-epoxycyclohexyl) methyltrimethoxysilane, 3,4-epoxycyclohexyl) methyltriethoxysilane, (3,4-epoxycyclohexyl) methyltripropoxysilane, (3,4-epoxycyclohexyl) methyltributoxysilane, 2-(3,4-epoxycyclohexyl) ethyitrimethoxysilane, 2-(3,4-epoxycyclohexyl) ethyltriethoxysilane, 2-(3,4-epoxycyclohexyl) ethyltripropoxysilane, 2-(3,4-epoxycyclohexyl) ethyltributoxysilane, 3-(3,4-epoxycyclohexyl) propyltrimethoxysilane, 3-(3,4-epoxycyclohexyl) propyltriethoxysilane, 3-(3,4-epoxycyclohexyl) propyltripropoxysilane, 3-(3,4-epoxycyclohexyl) propyltributoxysilane, 4-(3,4-epoxycyclohexyl) butyltrimethoxysilane, 4-(3,4-epoxycyclohexyl) butyltriethoxysilane, 4-(3,4-epoxycyclohexyl) butyltripropoxysilane, 4-(3,4-epoxycyclohexyl) butyltributoxysilane, diethoxy-3-glycidoxypropylmethylsilane, etc.

Particularly preferred silicon compounds having an epoxy and alkoxysilyl groups (B1) are 3-glycidoxypropyltrimethoxysilane and 2-(3,4-epoxycyclohexyl)ethyltrimethoxysilane.

The above silicon compounds may be used alone or in combination.

Silicon Compound Having Amino And Alkoxysilyl Groups (B2)

The compound (B2) of the present invention is a silicon compound having amino and alkoxysilyl groups, a full or partial hydrolysis product thereof, a full or partial condensation product thereof, or a mixture thereof. A preferable silicon compound having amino and alkoxysilyl groups is represented by the following formula (2):

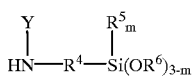

(2)

where $R^4$ is alkylene having 1 to 4 carbon atoms,
$R^5$ and $R^6$ are independently alkyl having 1 to 4 carbon atoms,
Y is hydrogen or aminoalkyl, and
m is 0 or 1.

Examples of the silicon compounds having amino and alkoxysilyl groups (B2) include
aminomethyltriethoxysilane, 2-aminoethyltrimethoxysilane, 2-aminoethyltriethoxysilane, 2-aminoethyltripropoxysilane, 2-aminoethyltributoxysilane,
1-aminoethyltrimethoxysilane,
1-aminoethyltriethoxysilane,
3-aminopropyltrimethoxysilane,
3-aminopropyltriethoxysilane,
3-aminopropyltripropoxysilane,
3-aminopropyltributoxysilane,
2-aminopropyltrimethoxysilane,
2-aminopropyltriethoxysilane,
2-aminopropyltripropoxysilane,
2-aminopropyltributoxysilane,
1-aminopropyltrimethoxysilane,
1-aminopropyltriethoxysilane,
1-aminopropyltripropoxysilane,
1-aminopropyltributoxysilane,
N-aminomethylaminomethyltriethoxysilane,
N-aminomethylaminomethyltripropoxysilane,
N-aminomethyl-2-aminoethyltrimethoxysilane,
N-aminomethyl-2-aminoethyltriethoxysilane,
N-aminomethyl-2-aminoethyltripropoxysilane,
N-aminomethyl-3-aminopropyltrimethoxysilane,
N-aminomethyl-3-aminopropyltriethoxysilane,
N-aminomethyl-3-aminopropyltripropoxysilane,
N-aminomethyl-2-aminopropyltrimethoxysilane,
N-aminomethyl-2-aminopropyltriethoxysilane,
N-aminomethyl-2-aminopropyltripropoxysilane,
N-aminopropyltrimethoxysilane,
N-aminopropyltriethoxysilane, N-(2-aminoethyl)-2-aminoethyltrimethoxysilane, N-(2-aminoethyl)-2-aminoethyltriethoxysilane, N-(2-aminoethyl)-2-aminoethyltripropoxysilane, N-(2-aminoethyl)-1-aminoethyltrimethoxysilane, N-(2-aminoethyl)-1-aminoethyltriethoxysilane, N-(2-aminoethyl)-1-aminoethyltripropoxysilane, N-(2-aminoethyl)-3-aminopropyltriethoxysilane, N-(2-aminoethyl)-3-aminopropyltripropoxysilane, N-(3-aminopropyl)-2-aminoethyltrimethoxysilane, N-(3-aminopropyl)-2-aminoethyltriethoxysilane, N-(3-aminopropyl)-2-aminoethyltripropoxysilane, N-methyl-3-aminopropyltrimethoxysilane,
3-aminopropylmethyldimethoxysilane,
3-aminopropylmethyldiethoxysilane, N-(2-aminoethyl)-3-aminopropylmethyldimethoxysilane,
3-diethylenetriaminopropyltriethoxysilane, 3-[2-(2-aminoethylaminoethylamino)propyl]trimethoxysilane, trimethoxysilylpropyldiethylenetriamine, etc.

Particularly preferred silicon compounds having amino and alkoxysilyl groups (B2) are
3-aminopropyltrimethoxysilane,
3-aminopropyltriethoxysilane,
3-aminopropylmethyldiethioxysilane, N-methyl-3-aminopropyltrimethoxysilane, N-(2-aminoethyl)-3-aminopropyltrimethoxysilane, and N-(2-aminoethyl)-3-aminopropylmethyldimethoxysilane.

These silicon compounds having amino and alkoxysilyl groups may be used alone or in combination.

Hydrolysis and Condensation Products of Compounds (B1) and (B2)

The full or partial hydrolysis product, or the full or partial condensation product of the above silicon compound are obtained through so-called sol-gel reaction of the silicon compound. The condensation product of the silicon compound may include not only a condensation product between the silicon compound but also a condensation product between an unreacted silicon compound and a full or partial hydrolysis product of the silicon compound.

The compounds (B1) and (B2) used as the starting material may be a silicon compound itself, or a hydrolysis product or condensation product of a silicon compound which has been previously prepared.

The hydrolysis of the silicon compound may be carried out using, for example, an inorganic acid such as hydrochloric acid, an organic acid such as acetic acid, or an alkali such as sodium hydroxide, or only water. The hydrolysis may be carried out after mixing a silicon compound and a solvent in order to make the hydrolysis uniform. Heating or cooling may be effected during the hydrolysis if necessary.

Alternately, a solvent such as alcohol may be removed after the hydrolysis by heating and/or evacuation or an appropriate solvent may be further added.

Cross Linking Reaction

By reacting the above compounds (B1) to (B3) in accordance with the present invention, the cured polymer layer can have a combination of excellent chemical or solvent resistance, gas barrier properties and adhesivity in addition to optical isotropy, surface smoothness, durability, water moisture barrier properties, a flexibility and so on.

In this reaction, it is believed that by using a combination of the silicon compound having epoxy and alkoxysilyl groups (B1) and the silicon compound having amino and alkoxysilyl groups (B2), not only (1) the reaction between the silanol groups of the alkoxysilyl groups, but also
(2) the reaction between the epoxy and amino groups, and
(3) the reaction between the silanol group of the alkoxysilyl group and the hydroxy group of the polyvinyl alcohol-based polymer, occur as the main reactions. Thus, there is formed a cured product from a reaction between the two types of the silicon compounds and a cross-linked product of the polyvinyl alcohol-based polymer and, as a result, the reaction product exhibits excellent chemical or solvent resistance and the other properties.

Cross Linked Polymer

As a result of the above reaction, it is considered that the reaction product of the present invention includes the chemical bond represented by the following formula (3):

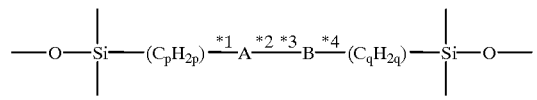

(3)

where p is an integer of 0 to 5, q is an integer of 0 to 5;

A stands for

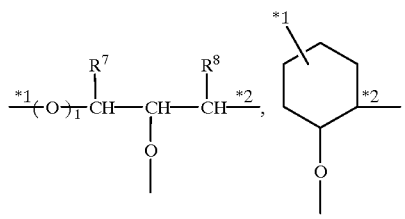

$R^7$ and $R^8$ are independently hydrogen, methyl, ethyl or phenyl, and l is 0 or 1;

B stands for

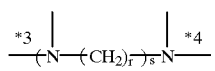

where r is an integer of 0 to 5, and s is an integer of 0 to 2; and

*2 and *3 are sites bonded to each other.

The structure of the main cross-linkages of the present invention may be the structure comprised only of the above formula (3), or may further comprise the structures as represented by the following formulae (5) and (6), and the like:

(5)

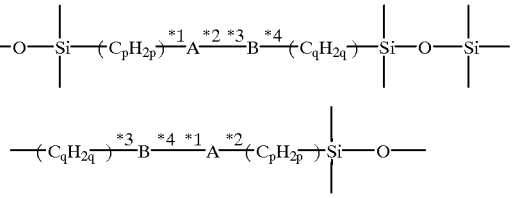

(6)

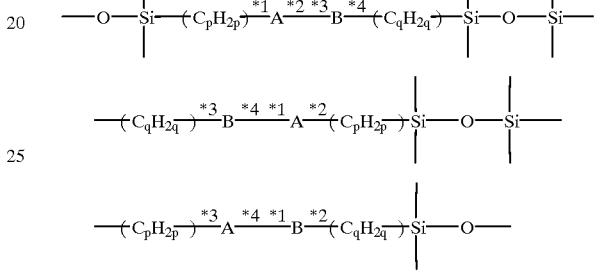

where the abrebiations are as defined in the formula (3).

Composition of Component (B)

The ratios between the compounds (B1) to (B3) used preferably satisfy the following formulae:

$1/9 \leq (B_3)/[(B_1)+(B_2)] \leq 9/1$, by weight, and $1/9 \leq (b_1)/(b_2) \leq 9/1$, by mole, where $B_1$ to $B_3$ stand for the amounts in weight of the compounds (B1) to (B3), respectively; $b_1$ stands for the amount of the compound B1) based on the mole of the epoxy group thereof; and $b_2$ stands for the amount of the compound B2) based on the total mole of the amino and imino groups thereof. More specifically, $B_1$ and $B_2$ are calculated based on the weights of the following compounds (1') and (2'), respectively:

(1')

(2')

For example, when 100 parts by weight of compound (B1) represented by the formula (1) is used, $B_1$ represents the weight of the compound having the structure as represented by the formula (1') which is a full condensation product and, therefore, $B_1$ is 90 parts by weight.

If the ratio $(B_3)/[(B_1)+(B_2)]$ is over 9/1, the water resistance and chemical resistance tend to be lowered. If the ratio $(B_3)/[(B_1)+(B_2)]$ is less than 1/9, the gas barrier property decreases. The preferable range of the ratio $(B_3)/[(B_1)+(B_2)]$ is 2/8 to 8/2, more preferably 1/3 to 3/1. When a transparent electroconductive layer (C) is laminated on a cured polymer layer (B), $1/9<(B_3)/[(B_1)+(B_2)]<4/1$ is preferable for adhesion between the layers. When a silyl-containing polyvinyl alcohol is used, a preferable ratio $(B_3)/[(B_1)+(B_2)]$ is 2/1 to 1/9.

Properties of Component (B) and Combined Effects of Components (A) and (B)

The cured polymer layer (B) obtained by the above cross-linking reaction has excellent chemical or solvent resistance, gas barrier properties and adhesivity as well as other properties required for a transparent electrode substrate.

As described before, a polyvinyl alcohol-based polymer may have a gas barrier property but is deteriorated with water or at a high humidity atmosphere and has a poor adhesivity to a polycarbonate or other polymer substrate and a metal oxide layer. Some of these defects may be improved by adding a chemical resistant layer and an anchor layer, but they add manufacturing costs and the gas barrier property is still not sufficiently high.

The data shown in the following table are the properties of transparent polymer substrates, one of which is the commercially available one based on an ethylene-vinyl alcohol copolymer-based polymer ("prior art"), one of which is desired or aimed at the present ("target"), and one of which is obtained by the present invention ("invention"). The properties indicated are measured by the methods as described later in the section of Examples.

TABLE

| Properties | Prior Art | Target | Invention |
|---|---|---|---|
| Gas barrier: | | | |
| $O_2$ (50% RH) | 0.5 | <0.2 | <0.01 |
| $O_2$ (90% RH) | 10.5 | <10 | <0.05 |
| Chemical resistance: | | | |
| NMP | 2 min | >3 min | >5 min |
| Alkali | no change | no change | no change |
| Acid | no change | no change | no change |
| Adhesivity to: | | | |
| $SiO_x$ | 0/100 | 100/100 | 100/100 |
| Polycarbonate | 100/100 | 100/100 | 100/100 |

It is possible that the transparent electrode substrate has the following excellent chemical resistant properties:
 i) a change of haze value of not more than 1% when N-methylpyrorydone is put in contact with the cured polymer layer side of the transparent electrode substrate at 25° C. for 10 minutes followed by cleaning with water;
 ii) no deterioration when 3.5%-NaOH aqueous solution is put in contact with the cured polymer layer side of said transparent electrode substrate at 25° C. for 10 minutes followed by cleaning with water; and
 iii) no deterioration when 5.0%-HCl aqueous solution is put in contact with the cured polymer layer side of said transparent electrode substrate at 25° C. for 10 minutes followed by cleaning with water.

Furthermore, the cured polymer layer (B) can adhere to both a transparent polymer substrate, particularly polycarbonate, and a metal oxide layer, particularly silicon oxide.

As seen in the above table, all of the gas barrier properties (in $cm^3/m^2/atm/day$), the solvent resistances and the adhesivity are improved in the present invention.

It is to be noted that these improved properties of the present invention are basically obtained by the component (B) alone, although the properties of the commercially available one are obtained by the combination of the polyvinyl alcohol-based polymer with the chemical resistant layer and an anchor layer (six layers 2 to 4 are added as shown in FIG. 2). The gas barrier property as mentioned above of the present invention is one obtained by the combination of the component (B) and a metal oxide layer (A), but addition of only three layers as shown in FIG. 9 in accordance with the present invention allows to obtain properties superior to the properties of the prior art.

As shown in FIG. 3, a polyvinyl alcohol-based polymer has flexibility and gas barrier properties. By cross-linking a polyvinyl alcohol-based polymer with an alkoxysilane to form a hybrid polymer, the chemical resistance and abrasion resistance are provided to the hybrid polymer because of the cross-linked polymer has a microscopically uniformly linked structure.

Further, by selecting the specific silicon compound (a silane coupler-type compound) as the cross linking agent, the improvements are increased as described above.

Gas Barrier Property:

Referring to FIG. 4A, the oxygen permeations of gas barrier layers formed on a polycarbonate film (PC) are shown. The line indicated as "prior art" is of an ethylene-vinyl alcohol copolymer. The line indicated as "H/PC" is of the hybrid layer of a polyvinyl alcohol. The oxygen permeation of the hybrid layer at a low humidity is superior to the prior art. The line indicated as "$SiO_x$/PC" is of the $SiO_x$ layer, although this can be further improved by increasing the thickness of the $SiO_x$. Here, a lamination of the hybrid layer with the $SiO_x$ layer is theoretically expected to provide an oxygen permeation as shown by the broken line as indicated by "H/$SiO_x$/Pc (theoretical)". However, the actually measured oxygen permeation of the lamination of the hybrid layer with the $SiO_x$ layer is as shown by the solid line as indicated by "H/$SiO_x$/PC (measured)", which is significantly superior to the theoretical one and is constantly low even at a high humidity (90%RH). Thus, a gas barrier property beyond the target can be obtained by the combination of the hybrid layer and the $SiO_x$ layer (a metal oxide layer).

FIG. 4B shows the similar oxygen permeation of the gas barrier layers in relation to the temperature change. The combination of the hybrid layer and the $SiO_x$ layer also has a gas parrier property beyond the target.

This synergistic effect is obtained by the lamination of the hybrid layer and the $SiO_x$ layer as shown in FIG. 5, in which 41 denotes a polycarbonate film 100 µm thick, 42 denotes an $SiO_x$ layer 0.01 µm thick, and 43 denotes a hybrid layer 2 µm thick. One of the reasons for the synergistic effect is considered to be as follows. That is, as shown in FIG. 6A, the $SiO_x$ layer has pin holes and the lamination of the hybrid layer fills the pin holes. Since the hybrid layer itself has a gas barrier property as well as has an excellent adhesivity to the $SiO_x$ layer, this combination provides a synergistic effect of the gas barrier property, although it is not desired that the invention be bound to the specific theory.

Adhesivity:

As described above, the hybrid layer has an excellent adhesivity to the $SiO_x$ layer or a metal oxide layer. The hybrid layer also has an excellent adhesivity to an organic layer such as a polycarbonate film.

Thus, the cured polymer layer (B) of the present invention adheres to both a polymer layer, particularly polycarbonate, and a metal oxide layer, particularly silicon oxide. It is considered that the epoxy and amino groups contribute to the adhesion of the cured polymer layer to the polycarbonate layer and the silanol group contributes to the adhesion of the cured polymer layer to the silicon oxide layer.

As a result, the cured polymer layer (B) which is a gas barrier layer and a chemical resistant layer can be formed between any types of an organic layer and a metal oxide layer without an anchor layer.

Chemical or Solvent Resistance:

A hybrid layer has improved chemical or solvent resistances to NMP and acid.

However, the hybrid layer, for example, a hybrid of a polyvinyl alcohol with a typical alkoxysilane such as tetramethoxysilane (TMOS), does not have excellent chemical or solvent resistances to alkali as shown in FIG. 7.

In accordance with the present invention, the alkali resistance of the hybrid layer is attained by selecting specific two types of alkoxysilanes and using the two types of alkoxysilanes in combination.

These two alkoxysilanes are the silicon compound having epoxy and alkoxysilyl groups (B1) and the silicon compound having amino and alkoxysilyl groups (B2) as described in detailed above.

FIG. 8 schematically shows the reactions between the functional groups of the compounds (B1) to (B3). It should be noted that although both the epoxy and alkoxysilyl groups of the silicon compound (B1) react with each other and with the hydroxy group of the polyvinyl alcohol-based polymer (B3), the amino group of the silicon compound (B2) reacts only with the epoxide group of the silicon compound (B1), and not with the other functional groups of the compounds (B1) to (B3). This special reaction scheme of reaction and the nature of the functional groups of the compounds (B1) to (B3) are considered to provide the advantageous effects in the excellent alkali resistance as well as the other excellent properties such as gas barrier property, adhesivity, etc.

As a result, the lamination structure as shown in FIG. 9 provides ideal properties for a transparent polymer electrode substrate, in which 41 denotes a polycarbonate film 100 $\mu$m thick, 42 denotes an $SiO_x$ layer 0.01 $\mu$m thick, and 45 denotes a hybrid layer of the silicon compounds (B1) and (B2) and the polyvinyl alcohol-based polymer (B3), 2 $\mu$m thick.

Special Features of the Combination of Compounds (B1) to (B3)

Thus the above improvements are obtained by the special nature or property of the component (B).

More specifically, cross linkage of a polyvinyl alcohol-based polymer with an alkoxy silane, further a silane coupler-type compound, may increase a gas barrier property, some of the chemical resistances, and the adhesivity, but they are not sufficient. However, in accordance with the present invention, a specific combination of the two silicon compounds having specific functional groups (B1) and (B2) are used together with a polyvinyl alcohol-based polymer (B3), by which significant improvements in all the gas barrier properties, the solvent resistances and the adhesivity together with other necessary properties are unexpectedly obtained.

A cross-linking reaction of a polyvinyl alcohol-based polymer with a silane coupler is known and a silicon compound having epoxy and alkoxysilyl groups is used as such a silane coupler. However, a silicon compound having amino and alkoxysilyl groups in practice has not been used as such a silane coupler, particularly for cross-linking a polyvinyl alcohol-based polymer, probably since it does not provide an excellent cross-linked polymer. Although there are also many other alkoxysilanes and silane couplers, it has not been known that the combination of a silicon compound having epoxy and alkoxysilyl groups (B1) and a silicon compound having amino and alkoxysilyl groups (B) as the cross-linking agents used with a polyvinyl alcohol-based polymer can provide superior solvent resistant and other properties over a combination of a polyvinyl alcohol-based polymer with any silane coupler or even with other two or more silane coupler.

It is therefore considered that the reaction between the compounds (B1) to (B3) is essentially different from the reaction between a polyvinyl alcohol-based polymer (B3) with any silane coupler including (B1) or (B2) or even with two or more silane coupler as long as the combination is not (B1) and (B2).

The reaction between the compounds (B1) to (B3) is as described below and the cross-linking bond or structure is as expressed by the formula (3) and the like. The resultant cross linked structure of the polymer is novel.

Moreover, use of the above specific combination of the silicon compounds and the polyvinyl alcohol-based polymer for a transparent electrode polymer substrate, particularly for a liquid crystal cell, as well as the advantageous specific effects thereof, have never been suggested in the art.

In accordance with the present invention, not only are the properties of the transparent electrode substrate improved but also the transparent electrode substrate may be constructed from fewer layers which is economically advantageous.

Other Ingredients in Component (B) Carboxylic Acid:

If the ratio $(b_1)/(b_2)$ is between 1/9 and 9/1, more preferably 1/4 to 4/1, further preferably 1/6 to 6/1, the adhesivity, heat resistance, chemical resistance, water resistance, durability and other properties of the cured polymer layer can be excellent. If the amount of one of the compounds (B1) and (B2) is excess to the amount of the other compound, the above properties of the cured polymer layer are lowered.

Since the compound (B2), i.e., the silicon compound having amino and hydroxysilyl groups is a condensation catalyst for the hydrolysis of the compound (B1), i.e., the silicon compound having epoxy and hydroxysilyl groups and simultaneously acts as a polymerization catalyst for the epoxy group, addition of the component (B2) to a hydrolysis product of the component (B1) causes immediate reaction and gelation of the coating composition. To prevent this, it is preferred to add a carboxylic acid to the component (B2) so as to form a weak acid salt of an organic acid and increase the pot life. The carboxylic acid may be formic acid, acetic acid, propionic acid, lactic acid, etc. Acetic acid is most preferred due to its acidity and volatility.

The amount of the carboxylic acid is generally in a range of 0.01 to 10 moles, preferably 0.1 to 5.0 moles per each mole of the total mole number of the amino and imino groups. If the amount is less than 0.01 mole, the pot life of the composition is short and gelation may occur. If the amount is more than 10 moles, the curing of the composition may become insufficient and the properties of the cured polymer layer are lowered.

Solvent:

The solvent should include a solvent which can dissolve the polyvinyl alcohol-based polymer, for example, water, dimethylimidazol, etc. The content of a polyvinyl alcohol-based polymer-dissolving solvent is preferably not less than 30% by weight of the total solvent. When an ethylene-vinyl alcohol copolymer is used, water/propanol may be used as a solvent for the copolymer, in which the mixing weight ratio between the water to propanol is preferably 3/7 to 7/3. Any solvent which is compatible with a polyvinyl alcohol-based polymer and in which the compounds (B1) and (B2)

may be dissolved can be used in combination with the above solvent. Examples of such solvents are alcohols, cellosolves, ketones, amides, etc. Among them, alcohols such as butanol, cellosolves such as 1-methoxy-2-ropanol, and ketones such as cyclohexanone are preferable solvents to provide excellent surface smoothness. These additional solvents themselves may be used alone or in combination.

The amount of the solvent is preferably in a range of 200 to 99900 parts by weight to 100 parts by weight of the total solid content of the compounds (B1) to (B3). If the amount of the solvent is less than 200 parts by weight, the stability of the coating solution is lowered. If the amount of the solvent is more than 99900 parts by weight, the solid content in the coating solution is low so that the thickness of the coating layer obtainable is limited.

Curing Agent:

A curing agent optionally may be added. The curing agent may be aluminum chelate compounds such as aluminum acetylacetonate, aluminum ethylacetylacetate bisacetylacetate, aluminum bisacetoacetateacetylacetonate, aluminum di-n-butoxidemonoethylacetoacetate and aluminum di-i-propoxidemonomethylacetoacetate; alkali metal salts of carboxylic acid such as sodium carboxylate, potassium carboxylate and potassium formate; amine carboxylates such as dimethylamineacetate, ethanolacetate and dimethylanilineformate; tertiary ammonium salts such as benzyltrimethylammonium hydroxide, tetramethylammonium acetate and benzyltrimethylammonium acetate; metal carboxylic acids such as tin octanoate; amines such as triethylamine, triethanolamine and pyridine; and 1,8-diazabicyclo[5,4,0]-7-undecene. These curing agents may be used alone or in combination.

Additives:

Further, various additives may be optionally added. For example, a surfactant such as a silicon-based compound, a fluorine-containing surfactant and an organic surfactant may be used to improve the surface smoothness of the layer.

Epoxy resin, melamine resin, aramide resin, colloidal silica and the like which is compatible with the coating composition may be added as a modifier. These additives may improve the various characteristics of the cured polymer layer, for example, heat resistance, weatherability, water resistance, durability, adhesivity, chemical or solvent resistance and so on.

Coating Solution for Component (B):

Thus, as understood from the above descriptions, in accordance with the present invention, the coating solution for forming a cured polymer layer (B layer) preferably comprises:

B1) a silicon compound having epoxy and alkoxysilyl groups, a full or partial hydrolysis product thereof, a full or partial condensation product thereof or a mixture thereof;

B2) a silicon compound having amino and alkoxysilyl groups, a full or partial hydrolysis product thereof, a full or partial condensation product thereof or a mixture thereof;

B3) a polyvinyl alcohol-based polymer;

B4) a carboxylic acid;

B5) an organic solvent; and

B6) water.

Other optional ingredients are described elsewhere in this specification.

Coating Process of Forming a Layer of Component (B)

The cured polymer layer (B) is formed on a substrate by the steps of:

a) preparing a coating composition which comprises the ingredients (B1) to (B6) as mentioned above;

b) coating a substrate with the coating composition; and c) curing the coating composition by cross-linking reaction between the compounds (B1) to (B3) to form a cured polymer layer on the substrate.

More specifically, the process preferably comprises:

preparing an aqueous solution of the polyvinyl alcohol-based polymer (B3);

adding acetic acid to said aqueous solution of the copolymer;

first adding a silicon compound having epoxy and alkoxysilane groups (B1) to said solution and hydrolyzing said added silicon compound; and then adding a silicon compound having amino and alkoxysilane groups (B2) to said solution and hydrolyzing said added silicon compound.

Transparent Electroconductive Layer (C)

The transparent electroconductive layer (C) used in the present invention is preferably of a metal oxide from the viewpoints of transparency, electroconductivity and mechanical properties. For example, indium oxide, cadmium oxide and tin oxide added with tin, tellurium, cadminium, molybdenum, tangsten, fuluoride or the like as a dopant, zinc oxide and titanium oxide added with aluminum as a dopant can be mentioned. Among them, a layer of indium oxide containing tin oxide in an amount of 2 to 15% by weight (ITO) is particularly preferred since it has excellent transparency and electroconductivity. The transparent electroconductive layer (C) can be formed by evaporation, spattering, ion beam sputtering, ion plating, etc.

The thickness of the transparent electroconductive layer (C) is preferably 15 to 180 nm. If it is less than 15 nm, the layer is not continuous and the electroconductivity is insufficient. If it is more than 180 nm, the transparency and flexibility are lowered.

Arrangement of Components (A) to (D) in Electrode Substrate

In the liquid crystal display element of the present invention, the electrode substrate comprises the components (A) to (D) in which the transparent electroconductive layer (C) is located on the liquid crystal layer side of the transparent polymer substrate (D). The transparent electroconductive layer (C) is patterned and a liquid crystal aligning layer is formed thereon in use.

The metal oxide layer (A) and the cured polymer layer (B) are formed contiguous with each other or in contact with each other, by which not only an excellent gas barrier property and solvent resistance are obtainable but also the gas barrier property obtained is unexpectedly improved. The polyvinyl alcohol-based polymer is deteriorated with water and so the gas barrier property of the polyvinyl alcohol-based polymer layer is lowered under a highly humid condition. By cross-linking the polyvinyl alcohol-based polymer with the specific combination of the silicon compounds, the gas barrier property and the solvent resistance of the polyvinyl alcohol-based polymer-containing layer are significantly improved in comparison with the ethylene-vinyl alcohol copolymer layer which is used as a gas barrier layer in a commercially available liquid crystal display element using a resin electrode substrate. Further, by combining the cured polymer layer (B) of the present invention with a metal oxide layer (A), the gas barrier property can be kept low even under a highly humid condition since the metal oxide layer is not deteriorated with water. This is the reason why the combination of the cured polymer layer (B) with a metal oxide layer (A) is used as the gas barrier layer.

Moreover, by forming the cured polymer layer (B) and a metal oxide layer (A) contiguous with each other, the gas barrier property obtained is more than the addition of the gas barrier properties of the two layers and a synergistic effect is obtained.

FIGS. 4A and 4B show the oxygen permeation of gas barrier layers in relation to the relative humidity. Each gas barrier layer tested was formed on a polycarbonate substrate. The gas permeation of the cured polymer layer (B) obtained from the polyvinyl alcohol-based polymer cross-linked (B3) with the silicon compounds (B1, B2) (hereinafter also referred to as "H layer" or "hybrid layer") is significantly lower in comparison with the ethylene-vinyl alcohol copolymer layer at 50%RH, but it increases as the humidity increases. The gas permeation of the metal oxide layer, here a silicon oxide layer, is relatively low and constant irrespective of the humidity but is not sufficiently low and is deteriorated with a solvent such as an alkali. The gas permeation of the lamination of the metal oxide layer with the hybrid layer is theoretically expected to be as shown by the broken line in FIG. 4A. However, the actually obtained gas permeation of the lamination, which is as shown by the solid line in FIG. 4A, was significantly lower than expected. The gas permeation of the lamination of the present invention is far lower than that of the ethylene-vinyl alcohol copolymer layer irrespective of the humidity.

In the present invention, the location and order of the combination of the hybrid layer (B) and the metal oxide layer (A) in the electrode substrate are not limited except that the transparent electroconductive layer should be located outermost with respect to the liquid crystal layer side among the components (A) to (D).

However, the order of the lamination of the components (C)/(B)/(A)/(D) is a preferable one, since the cured polymer layer (B) protects the metal oxide layer (A) and the polymer substrate (D) from the transparent electroconductive layer side and from the liquid crystal layer side. The order of the layers (A) and (B) may be reversed. Alternate preferred orders may be (C)/(A)/(B)/(D) or (C)/(D)/(A)/(B) or (C)/(D)/(B)/(A).

In practice, the components (B) and (C) may be formed repeatedly on one side and/or both sides of the substrate (D) depending on the desired property. Some preferred examples of the order of the lamination in such structures are (C)/(B)/(A)/(D)/(B), (B)/(A)/(D)/(B)/(C), (C)/(A)/(B)/(D)/(B), (A)/(B)/(D)/(B)/(C) (C)/(B)/(A)/(B)/(D)/(B), (B)/(A)/(B)/(D)/(B)/(C).

Of course, any other orders may be adopted.

FIGS. 10A to 10D and 11A to 11F show some examples of the preferred order of the lamination of the components (A) to (D). The other orders are not illustrated since they are obvious without illustration.

Further, one or more additional layers may be optionally added to or inserted in the above lamination so as to improve some properties of the lamination or the electrode substrate. Particularly, an anchor layer (α) is preferably inserted to improve the adhesion of any of the components (A) to (D) to another layer component. Also, any gas barrier layer and/or solvent or chemical resistant layer may be used in combination with the components (A) and (B). A protecting layer may also be provided to the electrode substrate.

Anchor Layer

The anchor layer (α) may be of a silane coupler, a thermoplastic resin, a radiation-curable resin or a thermosetting resin.

Silane Coupler:

The silane coupler is advantageous when used with the silicon-containing layer. The silane coupler is an organic silicon compound represented by the following formula (7):

$$R^{11}{}_n\text{—Si—}R^{12}{}_{4-n} \quad (7)$$

where $R^{11}$ stands for an organic group having one or more of vinyl, methacryloxy, epoxy, amino, imino and mercapto, $R^{12}$ stands for a hydrolyzable substitute group such as alkoxy and halogen, and n is an integer of 1 to 2.

Examples of the silane coupler include vinyltriethoxysilane, vinyltrichlorosilane, vinyltris(2-methoxy-ethoxy) silane, 2-(3,4-epoxycyclohexyl)-ethyltrimethoxysilane, 3-glycidoxypropyltrimethoxysilane, 3-aminopropyltriethoxysilane, N-(2-hydroxyethyl)-3-aminopropyltriethoxysilane, 3-mercaptopropyl-trimethoxysilane and (dimethoxymethylsilylpropyl)-ethylenediamine, but it is not limited thereto.

Thermoplastic resin:

The thermoplastic resin may be, for example, phenoxy resin, polyester resin, polyurethane resin, polyacrylic resin, etc.

Radiation-Curable Resin:

The radiation-curable resin for the anchor layer is a resin which can be cured by irradiation with an ultra-violet ray, an electron beam, etc. The radiation-curable resin includes resins having a unsaturated double bond such as acryloyl, methacryloyl and vinyl in the molecule or unit thereof. A resin having acryloyl is preferred due to reactivity.

The radiation-curable resins may be a single compound or a mixture of compounds. It is preferred that it contains a multifunctional acrylate component having two or more acryloyl groups in the molecule or unit thereof for the solvent resistance. Examples of the multifunctional acrylate component include acrylate monomers such as dipentaerythritolpentaacrylate, dipentaerythritolhexaacrylate, pentaerythritoltetraacrylate, pentaerythritoltriacrylate and trimethylolpropanetriacrylate, or multifunctional acrylate oligomers obtained by polyester-modification or uretane-modification thereof.

The radiation curable resin layer is formed as below. A coating composition is prepared by adding to the above radiation curable resin composition optionally a light initiator and other additives such as an inhibitor, a leveling agent and a UV-absorber and modifiers such as a thermoplastic resin and a plasticizer. An organic solvent is optionally added to adjust the concentration and viscosity of the coating solution. The coating methods may be, for example, dip coating, spray coating, flow coating, roll coating, bar coating, spin coating, etc., which is followed by preliminarily drying and then exposure to irradiation. Thus, a cured layer is obtained.

If the resin is cured with UV-rays, a light initiator is essential. The initiator may be, for example, acetophenones such as diethoxyacetophone, 2-methyl-1-[4-(methylthio) phenyl]-morpholinopropane-1,2-hydroxy-2-methyl-1-phenylpropane-1-on and 1-hydroxycyclohexylphenylketone; bezoine-based compounds such as bezoine and benzyldimethylketal; thioxane-based compound such as 2,4-dichlorothioxanesone. A known light co-intiator such as trimethanolamine, methyldiethanolamine and ethyl 4-dimethylamine benzoate may be optionally added in an appropriate amount to improve the curability.

The thickness of the radiation curable layer is preferably 2 to 8 μm, more preferably 2 to 6 μm. If it is less than 2 μm, the solvent resistance is insufficient. If it is more than 8 mm, curing disadvantageously occurs due to curing shrinkage.

Thermo-Setting Resin:

The thermo-setting resin for the anchor layer is typically epoxy resin, isocyanate curable urethane resin, etc. Among them, cured phenoxy resins, phenoxy ether resins or phenoxy ester resins obtained by curing a phenoxy resins, phenoxy ether resins, or phenoxy ester resins with a multifunctional isocyanate compound are preferred.

The thickness of the thermo-setting resin layer is not limited, but if it is less than 3 μm, the solvent resistance is insufficient. The upper limit of the layer is determined by the balance between cost and solvent resistance, with not more than 20 μm, further not more than 10 μm being preferred.

The thermo-setting resin layer is formed as below. A coating solution is prepared by adding, to the above thermo-setting resin composition, optionally additives such as a reactive diluent, fine particles and a leveling agent and modifiers such as a thermoplastic resin and a plasticizer. An organic solvent is optionally added to adjust the concentration and viscosity of the coating solution. The coating method may be, for example, dip coating, spray coating, flow coating, roll coating, bar coating, spin coating, etc., which is followed by heat treating at 120° C. for not less than 3 minutes, more preferably at 130° C. for not less than 5 minutes to form a heat-cured layer.

The solvent-resistant protecting layer may be of a radiation-curable layer or a thermo-setting layer which can be similar to the radiation-curable layer or thermo-setting layer for the above anchor layer.

Fine-Particle-Containing Layer

Optionally, a layer containing inorganic or organic fine particles may be provided to the laminated substrate.

A polymer substrate is advantageous to reduce the cost because it can be processed by a roll-to-roll system. However, if the surface of the film is too smooth, the film has a poor sliding property because of a large contact area with a roll, etc. so that the film is deformed or curved by the blocking during winding the film, resulting in an increase in loss.

By adding fine particles to a layer of the film, particularly to an outermost layer of the film, the sliding property of the film can be improved by decreasing the contact surface area with a roll or the like and the deformation or curving of the film during winding the film can therefore be prevented.

This fine-particle-containing layer is preferably formed on at least one outermost layer of the laminated film.

This fine-particle-containing layer may be formed by coating a coating solution, in which inorganic or organic fine particles are added, on a substrate and curing the coated layer.

The coating solution in which inorganic or organic fine particles are added may be the coating solution for forming the cured polymer layer (B layer) described above or other coating solutions.

Preferable inorganic fine particles include silica and alumina since reduction of transparency by them is relatively low. The average particle size of the inorganic fine particles is preferably in a range of 0.5 to 5 μm when the layer is cured.

Preferable organic fine particles include particles of acryl resin, stylene resin, urethane resin, polycarbonate resin, nylon resin, etc. The average particle size of the organic fine particles is preferably in a range of 0.5 to 5 μm. If it is smaller than 0.5 μm, the sliding property is insufficient. If it is larger than 5 μm, the optical property is lowered.

The content of the inorganic or organic fine particles is preferably in an amount of 0.01 to 5 parts by weight, based on 100 parts by weight of the fine particles-containing cured layer. If it is less than 0.01 part by weight, the sliding property is insufficient. If it is higher than 5 parts by weight, the optical property such as the haze value is lowered.

The thickness of the inorganic or organic fine particles-containing layer is preferably in a range of 0.5 to 30 μm. If it is too thin, the layer may have defects in the form of particles. If it is too thick, it is difficult to obtain an excellent sliding property.

Other Components of LCD Element

Although the transparent electrode substrate comprising the components (A) to (D) of the present invention is used for at least one of the electrode substrates of the liquid crystal display element, both electrode substrates may be transparent electrode substrates comprising the components (A) to (D) of the present invention. Alternately, the other substrate may comprise a substrate which is not the component (B) of the present invention. The other substrate may be not transparent and may be made of a non-polymer.

Other Aspects of the Invention

According to an aspect of the present invention, as described above, there is also provided a transparent electrode substrate comprising the components (A) to (D) as described above. This transparent electrode substrate may be useful not only for a liquid crystal display element but also for other electrical devices using a transparent electrode substrate, for example, a touch panel, an electroluminescence device, a planar phosphor, etc.

Moreover, the component (B) as described above provides a significant chemical or solvent resistance, gas barrier property and adhesivity with excellent transparency, waster resistance, flexibility, and other mechanical properties. Accordingly, the layer of the component (B) may be used as a coating layer for an article made of not only a resin but also other materials such as a metal, ceramics, paper, etc. In this article, the metal oxide layer (A) and the transparent electroconductive layer (C) are not essential and are optional. The shape of an article is not limited to a sheet or film.

One preferable embodiment of this article is a polymer substrate comprising a metal oxide layer (A), a cured polymer layer (B) contiguous to said metal (D). (see FIG. 5).

Another preferable embodiment of this article is a polymer substrate comprising a transparent polymer layer (D), a metal oxide layer (A) on a side of the layer (D), a first cured polymer layer (B-1) contiguous with the metal oxide layer (A), a second cured polymer layer (B-2) formed on the other side of the layer (D) (see FIG. 9). In FIG. 9, 41 denotes a layer (D), 42 a layer (A) and 45 cured layers (B-1, B-2).

In this application for an article, the component (A) of the metal oxide layer is not essential as mentioned above but a combined use thereof is of course advantageous.

One of the most useful applications of the component (B) as the coating is particularly as a solvent resistant layer or a gas barrier coating for a drug or food container or wrapping.

The coated layer of the component (B) above may have an oxygen permeation at 40° C. and 90%RH of not more than 10 $cm^3/m^2$/day/atm, in addition to the chemical resistances (i) to (iii) as mentioned before in relation to the transparent electrode substrate.

EXAMPLES

The present invention is further described with reference to Examples, but is not limited thereto. It should be noted that the cured polymer layer of the component (B) of the present invention is preferably formed in contiguous with the metal oxide layer of the component (A) in a transparent electrode substrate, but the cured polymer layer of the component (B) formed on a substrate without a metal oxide layer is also novel and within the scope of the present invention.

In the Examples, the parts and percents are based on the weight if not specifically mentioned otherwise.

In the Examples, the evaluations were made in the following manners.

Appearance of the component (B) layer:

Naked eye inspection was used to determine the coloring, coating spots, etc.

Transparency:

The light permeation of a parallel ray with a wavelength of 550 nm was determined using a spectrophotometer (Hitachi Ltd., U-3500). The haze value was determined using COH-300A manufactured by Nippon Denshoku K.K.

Optical isotropy:

The retardation for a wavelength of 590 nm was determined using a multi wavelength birefrigence measuring apparatus M-150, manufactured by Nippon Spectroscopy Corp.

Surface smoothness:

The surface roughness was determined using TOPO-3D manufactured by WYCO Corp. Ra is a center line average surface roughness of a layer measured in a 256 μm long rectangular area with a pitch of 1 μm at a magnification of 400 by the phase shift interference method.

Chemical or solvent resistance (1):

The appearance of a sample was inspected after immersing the sample in an aqueous 3.5%-NaOH solution at 25° C. for 10 minutes, cleaning with a flowing water and drying.

Chemical or solvent resistance (2):

The appearance of a sample was inspected after immersing the sample in an aqueous 5.0%-HCl solution at 25° C. for 10 minutes, cleaning with a flowing water and drying.

When a transparent electroconductive layer (C) is formed, this evaluation was carried out for the sample prior to the formation of the layer (C).

Chemical or solvent resistance (3):

Test (1):

For a laminate with a transparent electroconductive layer, the laminate was immersed in N-methylpyroridone (NMP) at 25° C. for 10 minutes and change of appearance was inspected, change of haze value was measured, and change of the resistance was measured. If peeling, reduction of surface smoothness, or clouding of the coating layer was seen by naked eye inspection, or if a change of haze value was more than 1%, the evaluation was indicated as "deteriorated appearance".

Test (2):

For a laminate without a transparent electroconductive layer, a few drops of NMP were dropped onto the laminate at 80° C. on the side of the cured polymer layer (B), which was allowed to stand at 80° C. for 1 minute and cleaned with a flowing water, and the appearance was inspected.

Test (3):

For a laminate without a transparent electroconductive layer, a few drops of NMP were dropped onto the laminated at 80° C. on the side of the cured polymer layer (B), which as allowed to stand at 80° C. for 10 minutes and cleaned with a flowing water, and the appearance was inspected.

Water vapor barrier property:

The water vapor barrier property and the following gas barrier properties were measured for a cured polymer layer without forming a transparent electroconductive layer thereon.

The water vapor permeation was determined in an atmosphere of 40° C. and 90%RH using Permatoran W1A manufactured by Modern Control Corp. (MOCON Corp).

Gas barrier property (1):

The oxygen permeation was determined in an atmosphere of 30° C. and 50%RH using OX-TRAN 2/20 manufactured by MOCON Corp.

Gas barrier property (2):

The oxygen permeation was determined in an atmosphere of 30° C. and 90%RH using OX-TRAN 2/20 manufactured by MOCON Corp.

Adhesivity:

The surface of a sample was cut in the form of a matrix with a pitch of 1 mm to form 100 small square sections. A cellophane adhesive tape (Cellotape, manufactured by Nichiban K.K.) was applied onto the cut sample and rapidly peeled in a direction at an angle of 90° to the surface. The number of the small square sections on the sample was counted to evaluate the adhesivity. The score "100/100" means the complete adhesivity and "0/100" means the complete peeling. (according to JIS K5400)

Flexibility:

The appearance of a sample was inspected after wrapping and unwrapping it around a glass tube with a diameter of 10 mmφ. If cracks appear (particularly when a crack larger than 5 mm appears on the surface of a transparent electroconductive electrode), the evaluation is not good.

Durability:

The appearance of a cured layer was inspected after heating at 60° C. and 90%RH for 100 hours in a thermohygrostat followed by allowing it cool.

Sliding property:

A film having a width of 50 cm and a length of 50 m was wound on a roll and the deformation or curvature of the film was inspected.

Examples 1 to 8

A polycarbonate resin whose bisphenol component consisted of bisphenol A and whose molecular weight was 37,000, was dissolved in methylene chloride in a concentration of 20% by weight and cast on a polyester film having a thickness of 175 μm by the die casting method. The cast film was dried to a remaining solvent concentration of 13% by weight and peeled from the polyester film. The obtained polycarbonate film was dried with balanced tensions between the latitude and ordinate directions in a drying oven at 120° C. to a remaining solvent concentration of 0.08% by weight.

The thus obtained transparent polycarbonate film had a thickness of 103 μm and a 550 nm light permeation of 91%.

On a surface of the polycarbonate film as a substrate, deposited was a metal oxide layer (A layer) by evaporating SiO chips at a vacuum of $5 \times 10^{-5}$ torr. The deposited silicon oxide layer had an average composition of $SiO_x$ (x is about 1.7 or 1.3).

Next, a polymer cured layer (B layer) was formed on the metal oxide layer by preparing coating solutions as described below. The compositions of the coating solutions are shown in Tables and the silicon compounds (B1) and (B2) listed in the tables are compounds which are prior to hydrolysis.

On the polycarbonate film or on the $SiO_{1.7}$ layer formed on the polycarbonate film, the coating solution which was aged at room temperature for 24 hours after the preparation thereof was coated by a Meyer bar and the coated layer was heated at 130° C. for 2 minutes to form a cured polymer layer (B layer).

Example 1

In this Example, a B layer was formed on the transparent polymer film or substrate of polycarbonate.

The coating solution for the B layer comprised a silanol-containing polyvinyl alcohol (R1130, manufactured by Kraray Corp. Ltd.) as the polyvinyl alcohol-based polymer (B3), 3-glycidoxypropyltrimethoxysilane as the silicon compound having epoxy and alkoxysilyl groups (B1) and aminopropyltrimethoxysilane as the silicon compound having amino and alkoxysilyl groups (B2), wherein the weight ratio $(B_3)/[(B_1)+(B_2)]$ was 2/1 and the molar ratio $(b_1)/(b_2)$ where $B_1$ to $B_3$ stand for the weight of the compounds (B1) to (B3) respectively and $b_1$ stands for the molar amount of the epoxy group and $b_2$ stands for the total molar amount of amino and imino groups was 1/1.

The coating solution was prepared by adding acetic acid to a mixture of polyvinyl alcohol and distilled water, stirring the mixture to make it uniform, dropwisely adding aminopropyltrimethoxysilane to the solution for effecting hydrolysis, stirring the solution for 30 minutes and adding 3-glycidoxypropyltrimethoxysilane.

As seen in the Table 1, all the evaluations of the laminate were good.

Example 2

In this Example, a B layer was formed on the transparent polymer film of polycarbonate.

The coating solution for the B layer comprised the same polyvinyl alcohol-based polymer (B3), the silicon compound having epoxy and alkoxysilyl groups (B1) and the silicon compound having amino and alkoxysilyl groups (B2) as in Example 1, wherein the weight ratio $(B_3)/[(B_1)+(B_2)]$ was 2/1 and the molar ratio $(b_1)/(b_2)$ was 3/2.

The coating solution was prepared by adding acetic acid to a mixture of polyvinyl alcohol and distilled water, stirring the mixture to make it uniform, dropwisely adding aminoprolyltrimethoxysilane to the solution for effecting hydrolysis, and stirring the solution for 30 minutes. To this solution, an iropropyl alcohol solution of 3-glycidoxypropyltrimethoxysilane, to which 0.01N-hydrochloric acid had been gradually added while agitating and agitated for 30 minutes, was added.

As seen in the Table 1, all the evaluations of the laminate were good.

Example 3

In this Example, a silicon oxide layer as the metal oxide layer (A layer) was deposited on the polycarbonate film and then a B layer was formed on the A layer.

The procedures were the same as in Example 2 except that the composition of the coating solution used had the weight ratio $(B_3)/[(B_1)+(B_2)]$ of 2/1 and the molar ratio $(b_1)/(b_2)$ of 1/2.

As seen in the Table 1, all the evaluations of the laminate were good. Particularly the gas barrier property was significantly improved by proving the silicon oxide layer (A layer).

Example 4

In this Example, a silicon oxide layer as the metal oxide layer (A layer) was deposited on a polycarbonate film and then a B layer was formed on the A layer.

The procedures were the same as in Example 2 except that the composition of the coating solution used comprised aminopropyltriethoxysilane as the component (B2) and had the weight ratio $(B_3)/[(B_1)+(B_2)]$ of 2/1 and the molar ratio $(b_1)/(b_2)$ of 1/2.

As seen in the Table 1, all the evaluations of the laminate were good. Particularly the gas barrier property was significantly improved by providing the silicon oxide layer (A layer).

Example 5

In this Example, a silicon oxide layer as the metal oxide layer (A layer) was deposited on the polycarbonate film and then a B layer was formed on the A layer.

The procedures were the same as in Example 2 except that the composition of the coating solution used comprised 2-(3,4-epoxycyclohexyl)ethyltrimethoxysilane as the component (B1) and aminopropyltrimethoxysilane as the component (B2) and had the weight ratio $(B_3)/[(B_1)+(B_2)]$ of 2/1 and the molar ratio $(b_1)/(b_2)$ of 1/1.

As seen in the Table 1, all the evaluations of the laminate were good. Particularly the gas barrier property was significantly improved by providing the silicon oxide layer (A layer).

Example 6

In this Example, a silicon oxide layer as the metal oxide layer (A layer) was deposited on a polycarbonate film and then a B layer was formed on the A layer.

The procedures of preparing the coating solution were the same as in Example 2, except that the composition of the coating solution comprised the same components (B1) and (B3) as in Example 5 and aminopropyltriethoxysilane as the component (B2) and had the weight ratio $(B_3)/[(B_1)+(B_2)]$ of 1/1 and the molar ratio $(b_1)/(b_2)$ of 1/1.

As seen in Table 2, all the evaluations of the laminate were good. Particularly the gas barrier property was significantly improved by proving the silicon oxide layer (A layer).

Example 7

In this Example, a silicon oxide layer as the metal oxide layer (A layer) was deposited on the polycarbonate film and then a B layer was formed on the A layer.

The procedures of preparing the coating solution were the same as in Example 2, except that the coating solution comprised the same compounds (B1) and (B3) as in Example 6 and aminopropyltriethoxysilane as the compound (B2) and had the weight ratio $(B_3)/[(B_1)+(B_2)]$ of 1/1 and the molar ratio $(b_1)/(b_2)$ of 1/1.

The procedures of preparing the coating solution were the same as in Example 1, except that the coating solution comprised the same compounds (B1) and (B3) as in Example 1 and N-(2-aminoethyl)-3-aminopropyltrimethoxysilane and N-(2-aminoethyl)-3-amino-propylmethyldimethoxysilane as the compound (B2) and had the weight ratio $(B_3)/[(B_1)+(B_2)]$ of 3/1 and the molar ratio $(b_1)/(b_2)$ of 1/2.

As seen in the Table 2, all the evaluations of the laminate were good. Particularly the gas barrier property was significantly improved by proving the silicon oxide layer (A layer).

Example 8

In this Example, a silicon oxide layer as the metal oxide layer (A layer) was deposited on the polycarbonate film and then a B layer was formed on the A layer.

The procedures were the same as in Example 7 except that the polyvinyl-based alcohol used was Gocenol NM-11Q, manufactured by Nippon Synthetic Chemical Industry Ltd (a saponification degree of more than 99%).

As seen in the Table 2, all the evaluations of the laminate were good although a slight reduction was seen in the alkali resistance (solvent resistance 1).

Comparative Examples 1 to 5

Similar procedures to those in Examples 1 to 8 were carried out except that the layer(s) coated were as shown in Table 3.

Comparative Example 1

In this Comparative Example, a cured polymer layer in which a polyvinylalcohol-based polymer (B3) was not included was formed on the transparent polymer film of polycarbonate.

The coating solution for the cured polymer layer comprised 3-glycidoxypropyltrimethoxysilane (B1) and 3-aminopropyltrimethoxysilane (B2) only.

As seen in Table 3, the gas barrier property and the durability were poor.

Comparative Example 2

In this Comparative Example, a silicon oxide layer as the metal oxide layer (A layer) was deposited on the polycarbonate film and then a cured polymer layer in which a silicon compound having amino and hydrosilyl groups (B2) was not included was formed on the A layer.

The coating solution comprised a silanol-containing polyvinyl alcohol (B3) as used in Example 1 and 3-aminopropyltrimethoxysilane (B2) only.

As seen in Table 3, the alkali resistance (chemical resistance 1), NMP resistance (solvent resistance 3) and durability were poor and the adhesivity was slightly poor.

Comparative Example 3

In this Comparative Example, a cured polymer layer in which a silicon compound having amino and hydrosilyl groups (B2) was not included was formed on the transparent polymer film of polycarbonate.

The coating solution comprised a silanol-containing polyvinyl alcohol (B3) as used in Example 1 and 2-(3,4-ethoxycyclohexyl)ethyltrimethoxysilane (B1) only.

As seen in Table 3, the alkali resistance (solvent resistance 1), NMP resistance (solvent resistance 3), adhesivity and durability where poor.

Comparative Example 4)

In this comparative Example, a polycarbonate film on which a silicon oxide layer as the metal oxide layer of $SiO_{1.7}$ (A layer) was deposited but a cured polymer layer was not formed on the A layer, was evaluated.

The solvent resistances 1 to 3 and the oxygen barrier properties were low.

Comparative Example 5

In this comparative Example, a polycarbonate film on which a silicon oxide layer as the metal oxide layer of $SiO_{1.3}$ (A layer) was deposited but a cured polymer layer was not formed on the A layer was evaluated.

The solvent resistances 1 to 3 and the oxygen barrier properties were low.

Examples 9 to 15

Example 9

The polycarbonate film on which the metal oxide layer (A layer) of the silicon oxide was deposited, which was the same as in Examples 3 to 5, was also used in this Example.

Next, a cured polymer layer (B layer) was formed on the metal oxide layer by preparing a coating solutions as described below. The compositions of the coating solutions are shown in Tables 4 and 5 and the silicon compounds (B1) and (B2) listed in Tables 4 and 5 were compounds which were prior to hydrolysis.

The coating solution for forming a cured polymer layer (B layer) was prepared as below: 100 parts by weight of an ethylene-vinyl alcohol copolymer (EVOH-F manufactured by Kuraray, ethylene copolymerization ratio of 32%) as the polyvinyl alcohol-based polymer (B3) was added to a mixed solvent of 720 parts by weight of water, 1080 parts by weight of n-propanol and 100 parts by weight of n-butanol, which was heated to obtain a uniform solution. To this solution, 0.1 part by weight of a silicon oil (SH30PA, manufactured by Toray Dow Corning Silicone Corp.) as a leveling agent and 62.4 parts by weight of acetic acid were added, followed by adding 85.8 parts by weight of 2-(3,4-epoxycyclohexyl)ethoxytrimethoxysilane as the silicon compound having epoxy and alkoxysilyl groups (B1) and stirring the solution for 10 minutes. 62.4 parts by weight of 3-aminopropyltrimethoxysilane as the silicon compound having amino and alkoxysilyl groups (B2) was then added to this solution and the solution was stirred for 3 hours to obtain a coating solution for forming a cured polymer layer (B layer). The composition of the coating solution was that the weight ratio $(B_3)/[(B_1)+(B_2)]$ was 1/1 and the molar ratio $(b_1)/(b_2)$ was 1/1.

On the $SiO_{1.7}$ layer (A layer) formed on the polycarbonate film, the coating solution was coated by a Meyer bar and the coated layer was heated at 130° C. for 3 minutes to form a cured polymer layer (B layer).

The obtained lamination was evaluated and the results are shown in Table 4.

As seen in Table 4, all the evaluations were good.

Examples 10 to 13

The procedures as in Example 9 were repeated but the composition of the coating solution was varied as shown in Table 4, in which the weight ratio $(B_3)/[(B_1)+(B_2)]$ was 2/1 in Example 10, 1/2 in Example 11, 1/3 in Example 12, 1/9 in Example 13, and the molar ratio $(b_1)/(b_2)$ was 1/1 in Examples 10 to 13.

The obtained lamination was evaluated and the results are shown in Table 4.

As seen in Table 4, all the evaluations were good.

Example 14

The procedures as in Example 9 were repeated but the compound B1 was changed to 3-glycidoxypropyltrimethoxysilane, and the weight ratio $(B_3)/[(B_1)+(B_2)]$ was 1/1 and the molar ratio $(b_1)/(b_2)$ was 1/1.

The obtained lamination was evaluated and the results are shown in Table 4.

As seen in Table 4, the evaluations were good for all.

Example 15

On the both surfaces of the polycarbonate film with the silicon oxide layer as in Example 9, the coating composition as in Example 9 was coated in the procedures as in Example 9.

The obtained lamination was evaluated and the results are shown in Table 4.

As seen in Table 4, the evaluations were good for all. The B layer had an excellent adhesivity to both the silicon oxide layer and the polycarbonate film and the obtained lamination had excellent chemical resistances on both sides thereof.

TABLE 1

| Example No. | Ex. 1 | Ex. 2 | Ex. 3 | Ex. 4 | Ex. 5 |
|---|---|---|---|---|---|
| A layer | — | — | $SiO_{1.7}$ | $SiO_{1.7}$ | $SiO_{1.7}$ |
| Compounds for forming a B layer (parts) | | | | | |
| B3) Silanol-containing polyvinyl alcohol | 5.0 | 5.0 | 5.0 | 3.0 | 5.0 |
| B3) Polyvinyl alcohol (saponification degree ≧ 99%) | 0 | 0 | 0 | 0 | 0 |
| B1) 3-glycidoxypropyltrimethoxysilane | 2.1 | 2.5 | 1.5 | 7.7 | 0 |
| B1) 2-(3,4-etoxycyclohexyl)-ethyltrimethoxysilane | 0 | 0 | 0 | 0 | 2.1 |
| B2) 3-aminopropyltrimethoxysilane | 1.6 | 1.2 | 2.3 | 0 | 1.6 |
| B2) 3-aminopropyltriethoxysilane | 0 | 0 | 0 | 7.2 | 0 |
| B2) N-(2-aminoethyl)-3-aminopropyltrimethoxysilane | 0 | 0 | 0 | 0 | 0 |
| B2) N-(2-aminoethyl)-3-aminopropylmethyldimethoxysilane | 0 | 0 | 0 | 0 | 0 |
| B4) Glacial acetic acid | 1.6 | 0.8 | 2.3 | 5.8 | 1.6 |
| B6) Distilled water | 95.0 | 95.0 | 95.0 | 97.0 | 95.0 |
| 0.01N—HCl | 0 | 0.6 | 0.4 | 1.80.6 | 0 |
| B5) Isopropyl alcohol | 0 | 2.5 | 1.5 | 15.4 | 2.5 |
| Evaluations | | | | | |
| Thickness of B layer (μm) | 2 | 2 | 2 | 2 | 2 |
| Appearance of B layer | good | good | good | good | good |
| Transparency (light permeation %, ΔH %) | 91, 0.3 | 91, 0.2 | 88, 0.3 | 89, 0.2 | 88, 0.2 |
| Optical isotropy (retardation, nm) | 8 | 9 | 8 | 7 | 8 |
| Surface roughness (Ra) | 5.7 | 5.1 | 6.8 | 7.57.8 | |
| Chemical resistance (1) | No change | No change | No change | No change | No change |
| Chemical resistance (2) | No change | No change | No change | No change | No change |
| Chemical resistance (3): | | | | | |
| Test (1) | — | — | — | — | — |
| Test (2) | No change | No change | No change | No change | No change |
| Test (3) | Deteriorated appearance | Deteriorated appearance | Deteriorated appearance | No change | Deteriorated appearance |
| Water vapor barrier property (g/(m² · atm · day)) | 48 | 19 | 2 | 1 | 2 |
| Gas barrier property (1) (cc/(m² · atm · day)) | 92 | 92 | <0.1 | <0.1 | <0.1 |
| Gas barrier property (2) (cc/(m² · atm · day)) | >500 | >500 | 7.2 | 0.8 | 6.8 |
| Adhesivity | 100/100 | 100/100 | 100/100 | 100/100 | 100/100 |
| Flexibility | No change | No change | No change | No change | No change |
| Durability | No change | No change | No change | No change | No change |

TABLE 2

| Example No. | Ex. 6 | Ex. 7 | Ex. 8 |
|---|---|---|---|
| A Layer | $SiO_{1.7}$ | $SiO_{1.7}$ | $SiO_{1.7}$ |
| Compounds for forming a B layer (parts) | | | |
| B3) Silanol-containing polyvinyl alcohol | 5.0 | 5.0 | 0 |
| B3) Polyvinyl alcohol (saponification degree ≧ 99%) | 0 | 0 | 5.0 |
| B1) 3-glycidoxypropyltrimethoxysilane | 0 | 1.2 | 1.2 |
| B1) 2-(3,4-etoxycyclohexyl)-ethyltrimethoxysilane | 4.3 | 0 | 0 |
| B2) 3-aminopropyltrimethoxysilane | 0 | 0 | 0 |
| B2) 3-aminopropyltriethoxysilane | 3.9 | 0 | 0 |
| B2) N-(2-aminoethyl)-3-aminopropyltrimethoxysilane | 0 | 0.3 | 0.3 |
| B2) N-(2-aminoethyl)-3-aminopropylmethyldimethoxysilane | 0 | 0.8 | 0.8 |
| B4) Glacial acetic acid | 3.0 | 1.0 | 1.0 |
| B6) Distilled water | 95.0 | 95.0 | 95.0 |
| 0.01N—HCl | 0.9 | 0 | 0 |
| B5) Isopropyl alcohol | 5.0 | 0 | 0 |
| Evaluations | | | |
| Thickness of B layer (μm) | 2 | 2 | 2 |
| Appearance of B layer | good | good | good |
| Transparency (light permeation %, ΔH %) | 89, 0.2 | 88, 0.3 | 89, 0.3 |
| Optical isotropy (retardation, nm) | 9 | 8 | 8 |

TABLE 2-continued

| Example No. | Ex. 6 | Ex. 7 | Ex. 8 |
|---|---|---|---|
| Surface roughness (Ra) | 4.9 | 6.9 | 6.2 |
| Chemical resistance (1) | No change | No change | Slightly attacked |
| Chemical resistance (2) | No change | No change | No change |
| Chemical resistance (3): | | | |
| Test (1) | — | — | — |
| Test (2) | No change | No change | No change |
| Test (3) | No change | Deteriorated appearance | Deteriorated appearance |
| Water vapor barrier property $(g/(m^2 \cdot atm \cdot day))$ | 2 | 4 | 4 |
| Gas barrier property (1) $(cc/(m^2 \cdot atm \cdot day))$ | <0.1 | <0.1 | <0.1 |
| Gas barrier property (2) $(cc/(m^2 \cdot atm \cdot day))$ | 5.0 | 7.3 | 7.4 |
| Adhesivity | 100/100 | 100/100 | 100/100 |
| Flexibility | No change | No change | No change |
| Durability | No change | No change | No change |

TABLE 3

| | Comparative Example No. | Com. Ex. 1 | Com. Ex. 2 | Com. Ex. 3 | Com. Ex. 4 | Com. Ex. 5 |
|---|---|---|---|---|---|---|
| | A Layer | — | $SiO_{1.7}$ | — | $SiO_{1.7}$ | $SiO_{1.3}$ |
| | Compounds for forming a B layer (parts) | | | | | |
| B3) | Silanol-containing polyvinyl alcohol | 0 | 5.0 | 5.0 | 0 | 0 |
| B3) | Polyvinyl alcohol (saponification degree ≧ 99%) | 0 | 0 | 0 | 0 | 0 |
| B1) | 3-glycidoxypropyltrimethoxysilane | 2.1 | 0 | 0 | 0 | 0 |
| B1) | 2-(3,4-etoxycyclohexyl)-ethyltrimethoxysilane | 0 | 0 | 4.2 | 0 | 0 |
| B2) | 3-aminopropyltrimethoxysilane | 1.6 | 3.2 | 0 | 0 | 0 |
| B2) | 3-aminopropyltriethoxysilane | 0 | 0 | 0 | 0 | 0 |
| B2) | N-(2-aminoethyl)-3-aminopropyltrimethoxysilane | 0 | 0 | 0 | | |
| B2) | N-(2-aminoethyl)-3-aminopropylmethyldimethoxysilane | 1.6 | 3.2 | 2.3 | 0 | 0 |
| B4) | Glacial acetic acid | 50.0 | 95.0 | 95.0 | 0 | 0 |
| B6) | Distilled water 0.01N—HCl | 0.5 | 0 | 0.4 | 0 | 0 |
| B5) | Isopropyl alcohol | 2.1 | 0 | 1.5 | 0 | 0 |
| | Evaluations | | | | | |
| | Thickness of B layer (μm) | 2 | 2 | 2 | — | — |
| | Appearance of B layer | good | good | good | — | — |
| | Transparency (light permeation %, ΔH %) | 91, 0.3 | 88, 0.2 | 90, 0.4 | 88, 0.4 | 78, 0.4 |
| | Optical isotropy (retardation, nm) | 8 | 9 | 10 | 8 | 9 |
| | Surface roughness (Ra) | 5.7 | 8.2 | 8.4 | 7.5 | 7.6 |
| | Chemical resistance (1) | No change | Deteriorated appearance | Deteriorated appearance | — | — |
| | Chemical resistance (2) | No change | No change | No change | — | — |
| | Chemical resistance (3): | | | | | |
| | Test (1) | — | — | — | — | — |
| | Test (2) | No change | Deteriorated appearance | Deteriorated appearance | Deteriorated appearance | Deteriorated appearance |
| | Test (3) | No change appearance | Deteriorated appearance | Deteriorated appearance | Deteriorated appearance | Deteriorated appearance |
| | Water vapor barrier property $(g/(m^2 \cdot atm \cdot day))$ | 30 | 8 | 33 | 6.9 | 4.9 |
| | Gas barrier property (1) $(cc/(m^2 \cdot atm \cdot day))$ | 250 | 0.5 | 8.5 | 100 | 91 |
| | Gas barrier property (2) $(cc/(m^2 \cdot atm \cdot day))$ | 250 | 11 | 180 | 98 | 92 |
| | Adhesivity | 100/100 | 70/100 | 0/100 | — | — |
| | Flexibility | No change | No change | No change | — | — |
| | Durability | Deteriorated appearance | Deteriorated appearance | Deteriorated appearance | — | — |

TABLE 4

| Example No. | Ex. 9 | Ex. 10 | Ex. 11 | Ex. 12 | Ex. 13 | Ex. 14 | Ex. 15 |
|---|---|---|---|---|---|---|---|
| A Layer ($SiO_x$) | $SiO_{1.7}$ | $SiO_{1.77}$ | $SiO_{1.7}$ | $SiO_{1.7}$ | $SiO_{1.7}$ | $SiO_{1.7}$ | $SiO_{1.7}$ |
| (Thickness) | (20 nm) | (20 nm) | (20 nm) | (20 nm) | (20 nm) | (20 nm) | (20 nm) |
| Compounds for forming a B layer (parts) | | | | | | | |
| B3) Ethylene-vinyl alcohol copolymer | 100 | 100 | 100 | 100 | 100 | 100 | 100 |
| B1) 2-(3,4-epoxycyclohexyl)-ethyltrimethoxysilane | 85.8 | 42.9 | 172 | 257 | 772 | 0 | 85.8 |
| B1) 3-glycidoxypropyltrimethoxysilane | 0 | 0 | 0 | 0 | 0 | 85.1 | 0 |
| B2) 3-aminopropyltrimethoxysilane | 62.4 | 31.2 | 125 | 187 | 562 | 64.6 | 62.4 |
| B6) Distilled water | 720 | 720 | 720 | 720 | 720 | 720 | 720 |
| B5) n-propanol | 1080 | 1080 | 1080 | 1080 | 1080 | 1080 | 1080 |
| n-butanol | 100 | 100 | 100 | 100 | 100 | 100 | 100 |
| B4) Acetic acid | 62.4 | 31.2 | 125 | 187 | 562 | 64.6 | 62.4 |
| B3) Leveling agent | 0.1 | 0.1 | 0.15 | 0.2 | 0.5 | 0.1 | 0.1 |
| Evaluations | | | | | | | |
| Thickness of B layer (μm) | 2.0 | 1.7 | 2.6 | 2.8 | 4.9 | 2.0 | 2.0 |
| Appearance of B layer | good | good | good | good | good | good | good |
| Transparency (light permeation %, ΔH %) | 91, 0.2 | 91, 0.2 | 91, 0.2 | 91, 0.2 | 91, 0.3 | 91, 0.3 | 91, 0.2 |
| Optical isotrophy (retardation, nm) | 8 | 8 | 8 | 8 | 9 | 8 | 8 |
| Surface roughness (Ra) | 2.7 | 2.0 | 2.8 | 3.0 | 3.5 | 2.8 | 2.7 |
| Chemical resistance (1) | No change | No change | No change | No change | No change | No change | No change |
| Chemical resistance (2) | No change | No change | No change | No change | No change | No change | No change |
| Chemical resistance (3): | | | | | | | |
| Test (1) | | | | | | | |
| Test (2) | No change | No change | No change | No change | No change | No change | No change |
| Test (3) | No change | Deteriorated appearance | No change | No change | No change | No change | No change |
| Water vapor barrier property (g/($m^2 \cdot$ atm $\cdot$ day)) | 1.8 | 1.7 | 1.8 | 1.8 | 2.0 | 1.8 | 1.8 |
| Gas barrier property (1) (cc/($m^2 \cdot$ atm $\cdot$ day)) | 0.3 | 0.2 | 0.4 | 0.5 | 0.8 | 0.3 | 0.3 |
| Gas barrier property (2) (cc/($m^2 \cdot$ atm $\cdot$ day)) | 0.4 | 0.3 | 0.6 | 0.5 | 0.8 | 0.4 | 0.4 |
| Adhesivity | 100/100 | 100/100 | 100/100 | 100/100 | 100/100 | 100/100 | 100/100 |
| Flexibility | No change | No change | No change | No change | No change | No change | No change |
| Durability | No change | No change | No change | No change | No change | No change | No change |

Examples 16 to 21

Examples 16 to 20

The polycarbonate film as in Example 9 was used but the silicon oxide layer was not formed thereon. The coating solutions of Examples 16 to 20 were the same as in Examples 9 to 12 and 14, respectively. The procedures for forming the cured polymer layer were the same as in Example 9.

The evaluations of the obtained laminations are shown in Table 5 and were all good.

Example 21

The procedures as in Example 9 were repeated but the substrate used was changed from the polycarbonate film to a polyester film having a thickness of 12 μm.

The obtained lamination was evaluated and the results are shown in Table 5.

As seen in Table 4, all the evaluations were good.

TABLE 5

| Example No. | Ex. 16 | Ex. 17 | Ex. 18 | Ex. 19 | Ex. 20 | Ex. 21 |
|---|---|---|---|---|---|---|
| A Layer ($SiO_x$) | $SiO_{1.7}$ | $SiO_{1.7}$ | $SiO_{1.7}$ | $SiO_{1.7}$ | $SiO_{1.7}$ | $SiO_{1.7}$ |
| (Thickness) | (20 nm) | (20 nm) | (20 nm) | (20 nm) | (20 nm) | (20 nm) |
| Compounds for forming a B layer (parts) | | | | | | |
| B3) Ethylene-vinyl alcohol copolymer | 100 | 100 | 100 | 100 | 100 | 100 |
| B1) 2-(3,4-epoxycyclohexyl)-ethyltrimethoxysilane | 85.6 | 42.9 | 172 | 257 | 0 | 85.6 |
| B1) 3-glycidoxypropyltrimethoxysilane | 0 | 0 | 0 | 0 | 85.1 | 0 |
| B2) 3-aminopropyltrimethoxysiiane | 62.4 | 31.2 | 125 | 187 | 64.6 | 62.4 |
| B6) Distilled water | 720 | 720 | 720 | 720 | 720 | 720 |
| B5) n-propanol | 1080 | 1080 | 1080 | 1080 | 1080 | 1080 |
| n-butanol | 100 | 100 | 100 | 100 | 100 | 100 |
| B4) Acetic acid | 62.4 | 31.2 | 125 | 187 | 64.6 | 62.4 |
| B3) Leveling agent | 0.1 | 0.1 | 0.15 | 6.2 | 0.1 | 0.1 |
| Substrate | PC | PC | PC | PC | PC | PET |

TABLE 5-continued

| Example No. | Ex. 16 | Ex. 17 | Ex. 18 | Ex. 19 | Ex. 20 | Ex. 21 |
|---|---|---|---|---|---|---|
| Evaluations | | | | | | |
| Thickness of B layer ($\mu$m) | 2.0 | 1.7 | 5.0 | 7.0 | 2.0 | 2.0 |
| Appearance of B layer | good | good | good | good | good | good |
| Gas barrier property (cc/m$^2$ · atm · day) | 13 | 9 | 22 | 30 | 14 | 9.0 |
| Adhesivity | 100/100 | 100/100 | 100/100 | 100/100 | 100/100 | 100/100 |
| Heat resistance (1) | No change | No change | No change | No change | No change | No change |
| Heat resistance (2) | No change | No change | No change | No change | No change | No change |
| Chemical resistance (1) | No change | No change | No change | No change | No change | No change |
| Chemical resistance (2) | No change | No change | No change | No change | No change | No change |
| Chemical resistance (3): | | | | | | |
| Test (1) | — | — | — | — | — | — |
| Test (2) | No change | No change | No change | No change | No change | No change |
| Test (3) | Deteriorated appearance | Deteriorated appearance | Deteriorated appearance | No change | No change | No change |
| Durability | No change | No change | No change | No change | No change | No change |
| Flexibility | No change | No change | No change | No change | No change | No change |

Comparative Examples 6 to 10

In comparative Examples 6 to 8, the procedures in Example 9 were repeated but the solution for forming the cured polymer layer was changed as shown in Table 6.

Comparative Example 6

This is a comparative example in which the silane compounds (B1) and (B2) were not added. Thus weight ratio (B$_3$)/[(B$_1$)+(B$_2$)] was 1/0.

In the evaluations, the NMP resistance (chemical resistance 3) and the adhesivity were poor.

Comparative Example 7

This is a comparative example in which the silane compound having amino and alkoxysilyl groups (B2) was not added, weight ratio (B$_3$)/[(B$_1$)+(B$_2$)] was 2/1 and the molar ratio (b$_1$)/(b$_2$) was 1/0.

In the evaluations, the alkali resistance (chemical resistance 1), the NMP resistance (chemical resistance 3) and the adhesivity were poor.

Comparative Example 8

This is a comparative example in which the silane compound having epoxy and alkoxysilyl groups (B2) was not added, the weight ratio (B$_3$)/[(B$_1$)+(B$_2$)] was 2/1 and the molar ratio (b$_1$)/(b$_2$) was 0/1.

In the evaluations, the appearance, the haze value, the alkali resistance (chemical resistance 1), the NMP resistance (chemical resistance 3) and the adhesivity were poor.

Comparative Example 9

The coating solution for forming a cured polymer layer as in Example 9 was coated on the polycarbonate film with the silicon oxide layer as in Example 9, but the coated side was opposite to the silicon oxide layer side.

In the evaluations as shown in Table 6, the gas barrier property was poor.

Comparative Example 10

Evaluations were made for the polycarbonate film alone used in Example 9.

TABLE 6

| Comparative Example No. | Com. Ex. 6 | Com. Ex. 7 | Com. Ex. 8 | Com. Ex. 9 | Com. Ex. 10 |
|---|---|---|---|---|---|
| A Layer (SiO$_x$) | SiO$_{1.7}$ | SiO$_{1.7}$ | SiO$_{1.7}$ | SiO$_{1.7}$ | — |
| (Thickness) | (20 nm) | (20 nm) | (20 nm) | (20 nm) | |
| Compounds for forming a B layer (parts) | | | | | |
| B3) Ethylene-vinyl alcohol copolymer | 100 | 100 | 100 | 100 | 0 |
| B1) 2-(3,4-epoxycyclohexyl) ethyltrimethoxysilane | 0 | 69.5 | 0 | 85.5 | 0 |
| B1) 3-glycidoxypropyltrimethoxysilane | 0 | 9 | 0 | 0 | 0 |
| B2) 3-aminopropyltrimethoxysilane | 0 | 0 | 81.4 | 62.4 | 0 |
| B6) Distilled water | 720 | 720 | 720 | 720 | 0 |
| B5) n-propanol | 1080 | 1080 | 1080 | 1080 | 0 |
| n-butanol | 100 | 100 | 100 | 100 | 0 |
| B4) Acetic acid | 0 | 62.4 | 62.4 | 62.4 | 0 |
| B3) Leveling agent | 0.1 | 0.1 | 0.1 | 0.1 | 0 |
| Evaluations | | | | | |
| Thickness of B layer ($\mu$m) | 2.0 | 2.2 | 2.2 | 2.0 | 0 |
| Appearance of B layer | good | good | good | good | — |
| Transparency (light permeation %, $\Delta$H %) | 91, 0.2 | 91, 0.3 | 91, 7.2 | 91, 0.2 | 91, 0.2 |
| Optical isotropy (retardation, nm) | 8 | 9 | — | 8 | 8 |
| Surface roughness (Ra) | 1.2 | 2.5 | — | 2.7 | 1.0 |

TABLE 6-continued

| Comparative Example No. | Com. Ex. 6 | Com. Ex. 7 | Com. Ex. 8 | Com. Ex. 9 | Com. Ex. 10 |
|---|---|---|---|---|---|
| Chemical resistance (1) | No change | Deteriorated appearance | Deteriorated appearance | No change | — |
| Chemical resistance (2) | No change | No change | No change | No change | — |
| Chemical resistance (3): | | | | | |
| Test (1) | — | — | — | — | — |
| Test (2) | Deteriorated appearance | No change | Deteriorated appearance | No change | Deteriorated appearance |
| Test (3) | Deteriorated appearance | Deteriorated appearance | Deteriorated appearance | No change | Deteriorated appearance |
| Water vapor barrier property ($g/m^2 \cdot atm \cdot day$) | 1.5 | 1.7 | — | 10 | 50 |
| Gas barrier property (1) ($cc/m^2 \cdot atm \cdot day$) | 0.15 | 0.3 | — | 7.8 | 1200 |
| Gas barrier property (2) ($cc/m^2 \cdot atm \cdot day$) | 0.3 | 0.5 | — | 17 | 1200 |
| Adhesivity | 0/100 | 0/100 | 0/100 | 100/100 | — |
| Flexibility | No change | No change | No change | No change | — |
| Durability | No change | No change | No change | No change | — |

Examples 22 to 24

Example 22

The polycarbonate film with the silicon oxide layer as in Example 3 was used.

A first coating solution for forming a cured polymer layer (B layer) was applied on the silicon oxide layer (A layer) of the substrate, by the microgravure method, and was heated at 130° C. for 3 hours to form a cured polymer layer having a thickness of 2 $\mu$m. The first coating solution prepared was the same as in Example 16.

A second coating solution for forming a protecting layer was applied on both the silicon oxide layer (A layer) and the B layer of the substrate by the microgravure method, which had been preliminarily dried at 50° C. for 1 minute, and was cured by irradiating with UV rays in a total exposure amount of 800 mJ/cm² by a high pressure mercury lamp with 160 W/cm to obtain the protecting layer having a thickness of 4 $\mu$m. The second coating solution was prepared by mixing 100 parts by weight of trimethylolpropanetriacrylate (Aronix M-309, manufactured by Toa Synthetic Chemical Corp.), 7 parts by weight of 1-hydroxycyclohexylphenylketone (Irgacure 184, manufactured by Chiba-Geigy) as the photoinitiator and 0.02 part by weight of a silicon oil (SH28PA, manufactured by Toray Dow Corning Corporation) as the leveling agent and diluting the mixture with 1-methoxy-2-propanol and methanol to a solid content of 35% by weight.

The thus obtained roll of the laminate with the polycarbonate film as the substrate was set in a sputtering apparatus which was evacuated to a pressure of 1.3 mPa. A mixed gas of Ar and $O_2$ ($O_2$ content of 1.4 vol%) was added and the pressure was adjusted to 9.27 Pa. A DC sputtering was conducted at an applied current density of 1 W/cm² using an ITO target ($SnO_2$ content of 5 wt %) to deposit a transparent electroconductive layer of the ITO having a thickness of 130 $\mu$m on the cured polymer layer which was in contact with the polycarbonate film.

Thus, a transparent electroconductive laminate (transparent electrode substrate) was obtained and evaluated.

The results are shown in Table 7.

Example 23

The procedures in Example 22 were repeated but the first coating solution was prepared by heat dissolving 100 parts by weight of a silyl-containing polyvinyl alcohol-based polymer (R1130 manufactured by Kraray, silyl content of less than 1%) (B3) in a mixture of 1300 parts by weight of water and 600 parts by weight of n-propanol to form a uniform solution, allowing it to cool to room temperature, adding 0.1 part by weight of a silicon oil (SH30PA manufactured by Toray Dow Corning Silicone Corp.) as a leveling agent and 124.8 parts by weight of acetic acid and then 124.8 parts by weight of 3-aminopropyltrimethoxysilane (B2) to the solution, stirring it for 3 hours, adding further 171.6 parts by weight of 2-(3,4-epoxycyclohexyl)ethyltrimethoxysilane (B1) to the solution and then stirring it for 3 hours. The composition had the weight ratio $(B_3)/[(B_9)+(B2)]$ was 1/2 and the molar ratio $(b_1)/(b_2)$ was 1/1.

The results are shown in Table 7.

Example 23

The procedures in Example 22 were repeated but the second coating solution was coated and heated at 180° C. for 5 minutes and then 130° C. for 5 minutes to obtain a protecting layer having a thickness of 5 $\mu$m. The second coating solution was prepared by mixing 20 parts by weight of a phenoxy ester resin (PKHM-30, manufactured by Union Carbide Corporation), 40 parts by weight of methylethylketone and 20 parts of 2-ethoxyethylacetate and then adding 20 parts of a multifunctional isocyanate (Coronate L, manufactured by Nippon Polyisocyanate) to the mixture.

The results are shown in Table 7.

Comparative Examples 11 and 12

Comparative Example 11

The procedures as in Example 22 was repeated but the cured polymer layer made from the first coating solution was not formed.

The results are shown in Table 7.

Comparative Example 12

The procedures as in Example 22 was repeated but the cured polymer layer was formed by changing the first coating solution to a polyvinyl alcohol-based polymer (Gocenol NM-11Q, manufactured by Nippon Synthetic Chemical Corp.).

The results are shown in Table 7.

In Tables 7 to 10, the following abbreviations are used.

PVA: Polyvinyl alcohol
SP: Silyl-containing polyvinyl alcohol (R1130, Kraray)
P: High-saponification polyvinyl alcohol (Gocenol NM-110, Nippon Synthetic Chemical Industry)
E: Ethylene-vinyl alcohol copolymer (EVAL F104, Kraray)
ECHETMOS: 2-(3,4-epoxycylcohexyl)-ethyltrimethoxysilane
APTMOS: 3-aminopropyltrimethoxysilane
H(2): B layer in Ex. 1
X(200): $SiO_x$ layer in Ex. 3
TF-PC: Polycarbonate film in Ex. 1
SX (70): $SiO_x$ layer in Ex. 28
G: filler included
Si content: $[(B_1+B_2)/(B_1+B_2+B_3)] \times 100$ (by weight)
B1 amount: $[b_1/(b_1+b_2)] \times 100$ (by mole)

TABLE 7

| Example No. | Ex. 22 | Ex. 23 | Ex. 24 | Com. Ex. 11 | Com. Ex. 12 |
|---|---|---|---|---|---|
| Layer structure | | | | | |
| Structure | H(2)/X(200)/TF-PC/UV/ITO | H(2)/X(200)/TF-PC/UV/ITO | H(2)/X(200)/TF-PC/Ph/ITO | X(200)/TF-PC/UV/ITO | UV/PVA(2)/X(200)/UV/TF-PC |
| Epoxysilane coupler (B1) | ECHETMOS | ECHETMOS | ECHETMOS | ECHETMOS | ECHETMOS |
| Aminosilane coupler (B2) | APTMOS | APTMOS | APTMOS | APTMOS | APTMOS |
| Polyvinyl alcohol-based polymer (B3) | E | SP | E | — | — |
| Si content | 50 | 66 | 50 | 50 | 0 |
| B1 amount | 50 | 50 | 50 | 50 | 0 |
| Evaluations | | | | | |
| Transparency (%, ΔH %) | 86, 0.2 | 86, 0.3 | 86, 0.2 | 89, 0.3 | 88, 0.2 |
| Optical isotropy (nm) | 9 | 8 | 7 | 9 | 10 |
| Chemical resistance (1) | No change | No change | No change | $SiO_x$ peeling | Deteriorated appearance |
| Chemical resistance (2) | No change | No change | No change | No change | Deteriorated appearance |
| Chemical resistance (3): | | | | | |
| Test (1) | No change | No change | No change | — | — |
| Test (2) | — | — | — | No change | Deteriorated appearance |
| Test (3) | — | — | — | No change | Deteriorated appearance |
| Water vapor barrier property (g/m²/day) | 0.9 | 2.5 | 0.9 | 5.8 | 5.8 |
| Gas barrier property (1) (cc/m² · atm · day); 50% RH | 0.10 | 0.15 | 0.12 | 50.2 | 0.05 |
| Gas barrier property (2) (cc/m² · atm · day); 90 % RH | 0.5 | 4.9 | 0.5 | 52.0 | 7.2 |
| Adhesivity | 100/100 | 100/100 | 100/100 | 100/100 | PVA peeling |
| Flexibility | No change | No change | No change | No change | Cracks |

Examples 25 to 27

Example 25

The polycarbonate film having a 20 µm-thick silicon oxide layer (A layer) was the same as in Example 3.

A first coating solution for forming a cured polymer layer (B layer) was prepared. The coating solution was coated on both sides of the above polycarbonate film with the silicon oxide layer (A layer) thereon, by the microgravure method, and was heated at 130° C. for 2 minutes to obtain cured polymer layers having a thickness of 2 µm.

The first coating solution was the same as used for forming a cured polymer layer (B layer) in Example 9.

On the cured polymer layer (B layer) which was formed on the silicon oxide layer, an ITO layer was deposited in the manner as in Example 22.

The thus obtained laminate was evaluated and the results are shown in Table 8.

Example 26

The procedures in Example 25 were repeated, but one of the cured polymer layers, which was formed on the silicon oxide layer, was prepared by using a second coating solution while the other cured polymer layer, which was formed directly on the polycarbonate film was, prepared by the first coating solution as in Example 30.

The second coating solution was prepared by heat dissolving 100 parts by weight of a silyl-containing polyvinyl alcohol-based polymer (R1130 manufactured by Kraray, silyl content of less than 1%) (B3) in a mixture of 1300 parts by weight of water and 600 parts by weight of n-propanol to form a uniform solution, allowing it to be cooled to room temperature, adding 0.1 part by weight of a silicon oil (SH30PA, manufactured by Toray Dow Corning Silicone Corp.) as a leveling agent and 124.8 parts by weight of acetic acid and then 171.6 parts by weight of 2-(3,4-epoxycyclohexyl)ethyltrimethoxysilane (B1) to the solution, stirring it for 10 hours, adding further 124.8 parts by weight of 3-aminopropyltrimethoxysilane (B2) to the solution and then stirring it for 3 hours. The composition had the weight ratio $(B_3)/[(B_1)+(B_2)]$ was 1/2 and the molar ratio $(b_1)/(b_2)$ was 1/1.

The thus obtained laminate was evaluated and the results are shown in Table 8.

Example 27

The procedures as in Example 25 were repeated but the silicon oxide layer was not formed.

The thus obtained laminate was evaluated and the results are shown in Table 8.

Comparative Example 13

The procedures as in Example 25 were repeated but the cured polymer layers formed were made of a polyvinyl alcohol-based polymer (Gocenol NM-1Q manufactured by Nippon Synthetic Chemical).

The thus obtained laminate was evaluated and the results are shown in Table 8.

The first coating solution used in this Example was prepared by the same procedures as in Example 26.

The thus obtained laminate was evaluated and the results are shown in Table 9.

TABLE 8

| Example No. | Ex. 25 | Ex. 26 | Ex. 27 | Com. Ex. 13 |
|---|---|---|---|---|
| Layer structure | | | | |
| Structure | ITO/H(2)/X(200)/ TF-PC/H(2) | SP66r50(2),IX(200)/ TF-PL/E5Or5O(2)/ITO | ITO/H(2)/TF-PC/H(2) | ITO/PVA/X(200), TF-PC/PVA |
| Epoxysilane coupler (B1) | ECHETMOS | ECHETMOS | EdHETMOS | ECHETMOS |
| Aminosilane coupler (B2) | APTMOS | APTMOS | APTMOS | APTMOS |
| Polyvinyl alcohol-based polymer (B3) | E | SP, E | E | F |
| Si content | 50 | 66, 50 | 50 | 0 |
| B1 amount | 50 | 50, 50 | 50 | 0 |
| Evaluations | | | | |
| Transparency (%, ΔH %) | 89, 0.3 | 89, 0.3 | 88, 0.2 | 89, 0.3 |
| Optical isotropy (nm) | 8 | 8 | 7 | 9 |
| Chemical resistance (1) | No change | No change | No change | Deteriorated appearance |
| Chemical resistance (2) | No change | No change | No change | Deteriorated appearance |
| Chemical resistance (3): | | | | |
| Test (1) | No change | No change | — | — |
| Test (2) | — | — | — | — |
| Test (3) | — | — | — | — |
| Water vapor barrier property (g/m$^2$/day) | 0.9 | 2.5 | 18.9 | 5.8 |
| Gas barrier property (1) (cc/m$^2$ · atm · day); 50% RH | 0.12 | 0.10 | 5.2 | 0.05 |
| Gas barrier property (2) (cc/m$^2$ · atm · day); 90% RH | 0.5 | 3.8 | 106 | 7.2 |
| Adhesivity | 100/100 | 100/100 | 100/100 | PVA peeling |
| Flexibility | No change | No change | No change | Cracks |

Examples 28 to 31

Example 28

The polycarbonate film used as the substrate was the same as in Example 1 except that the thickness of the film was 100 μm.

On the both sides of the polycarbonate film, cured polymer layers (B layer) were formed by coating a first coating solution by the microgravure method and heating it at 130° C. for 2 minutes to obtain a laminated substrate having the cured polymer layers (B layer) on both sides thereof.

The first coating composition used in this Example was the same as in Example 9.

The laminated substrate was set in a sputtering apparatus which was evacuated to a pressure of 1.3 mPa. A mixed gas of Ar/O$_2$ (O$_2$ concentration of 12.0 vol %) was introduced into the sputtering chamber and the pressure was adjusted to 0.27 Pa. DC magnetron sputtering was carried out using a polycrystalline Si metal target at an applied current density of 1 W/cm$^2$, to form an SiO$_2$ layer with a thickness of 7 nm on one of the cured polymer layers of the substrate.

On this SiO$_2$ layer formed was an ITO layer. The procedure of forming the ITO layer was the same as in Example 22.

The thus obtained laminate was evaluated and the results are shown in Table 9.

Example 29

The procedures of Example 28 were repeated, but the first coating solution was changed to the following solution and the heating of the coated layer was at 130° C. for 3 minutes.

Example 30

The polycarbonate film used was the same as in Example 28.

The first coating solution used in this Example was the same as in Example 10. This first coating solution was coated on one side of the polycarbonate film by the microgravure method and heated at 130° C. for 3 minutes to form a cured polymer layer (B layer) on one side thereof.

On the other side of the polycarbonate film, there was formed a solvent-resistant protecting layer by preparing a second coating solution, coating the second coating solution on said other side of the polycarbonate film in the microgravure method, preliminarily heating at 50° C. for 1 minute, and curing the coated layer by irradiation with UV rays from a high pressure mercury lamp of 160 W/cm in a total exposure amount of 800 mJ/cm$^2$ to form a cured protecting layer having a thickness of 4 μm.

The second coating solution used here was prepared by mixing 100 parts by weight of trimethylolpropanetriacrylate (Alonix M-309 manufactured by Toa Synthetic Chemical Corp.), 7 parts by weight of 1-hydroxycyclohexylhexylketone (Irgacure 184, manufactured by Chiba Geigy Limited) and a silicon oil (SH28PA, manufactured by Toray Dow Corning Silicone Corp.) as a leveling agent, followed by diluting with 1-methoxy-2-propanol and methanol to a solid content of 35% by weight.

On the cured polymer layer (B layer) of the laminated substrate, a silicon oxide layer as in Example 28 was deposited in the manner as in Example 28.

On the soivent-resistant protecting layer of the laminated substrate, an ITO layer as in Example 28 was then deposited in the manner as in Example 28.

The thus obtained laminate was evaluated and the results are shown in Table 9.

Example 31

The procedures as in Example 28 were repeated but the ITO layer was formed on a side of the cured polymer layer (B layer) which was formed directly on the polycarbonate film, not on the side of the cured polymer layer (B layer) which was formed on the silicon oxide layer.

The thus obtained laminate was evaluated and the results are shown in Table 9.

The thus obtained laminate was evaluated and the results are shown in Table 10.

Example 33

The procedures as in Example 32 were repeated, but the first cured polymer layer acting as the anchor layer for the $SiO_x$ layer was changed to an anchor layer of a silane coupler (AP133, manufactured by Nippon Unitika) having a thickness of 50 nm, and the $SiO_x$ layer was changed to a metal oxide layer mainly comprised of $SiO_x$ by evaporating a mixture of Si, $SiO_2$ and $MgF_2$, the metal oxide layer having a thickness of 100 nm, the content of $MgF_2$ in the $SiO_x$ layer was about 10% by weight.

TABLE 9

| Example No. | Ex. 28 | Ex. 29 | Ex. 30 | Ex. 31 |
|---|---|---|---|---|
| Layer structure | | | | |
| Structure | ITO/SX(70)/H(2)/TF-PC/H(2) | ITO/SX(70)/H(2)/TF-PC/H(2) | ITO/UV(4)/TF-PC/ | SX(70)/H(2)/TF-PC/H(2)/ITO |
| Epoxysilane coupler (B1) | ECHETMOS | ECHETMOS | ECHETMOS | ECHETMOS |
| Aminosilane coupler (B2) | APTMOS | APTMOS | APTMOS | APTMOS |
| Polyvinyl alcohol-based polymer (B3) | E | SP | E | E |
| Si content | 50 | 66 | 25 | 50 |
| B1 amount | 50 | 50 | 50 | 50 |
| Evaluations | | | | |
| Transparency (%, ΔH %) | 86, 0.3 | 86, 0.3 | 85, 0.4 | 86, 0 |
| Optical isotropy (nm) | 8 | 8 | 8 | 8 |
| Chemical resistance (1) | No change | No change | No change | No change |
| Chemical resistance (2) | No change | No change | No change | No change |
| Chemical resistance (3): | | | | |
| Test (1) | No change | No change | No change | No change |
| Test (2) | — | — | — | — |
| Test (3) | — | — | — | — |
| Water vapor barrier property (g/m$^2$/day) | 0.9 | 1.8 | 1.5 | 0.9 |
| Gas barrier property (cc/m$^2$ · atm · day); 50% RH | 0.5 | 1.8 | 2.6 | 0.5 |
| Adhesivity | 100/100 | 100/100 | 100/100 | 100/100 |
| Flexibility | No change | No change | No change | No change |
| Surface resistance (Ω/□) | 40 | 40 | 40 | 40 |

Examples 32 to 38

Example 32

The polycarbonate film used as the substrate was the same as that in Example 1.

On both surfaces of the polycarbonate film, the first coating solution for forming a cured polymer layer (B layer) as used in Example 9 was coated and cured.

The thus obtained laminate was set in an evaporation apparatus and an $SiO_x$ layer (x is about 1.7) having a thickness of 20 nm (A layer) was deposited on one of the cured polymer layers of the substrate from an evaporation source of a mixture of Si and $SiO_2$ under a vacuum of 1.3 mPa. This underlayer of the cured polymer layer acted as an anchor layer.

The first coating solution was coated again on the silicon oxide layer and heated at 130° C. for 2 minutes to form a second cured polymer layer (B layer) having a thickness of 2 μm.

On this second cured polymer layer, an ITO layer was formed in the same manner as in Example 22.

Thus, a laminate structure of first cured polymer layer (B layer)/polycarbonate film (D layer)/first cured polymer layer (B layer or anchor layer)/$SiO_x$ layer (A layer)/second cured polymer layer (B layer)/ITO layer (C layer) was obtained.

The thus obtained laminate was evaluated and the results are shown in Table 10.

Example 34

The procedures as in Example 32 were repeated, but the first cured polymer layers on the both sides of the polycarbonate film were changed to UV-cured layers having a thickness of 4 μm, which were formed using a coating solution for forming a solvent resistant coating layer as used in Example 37 (trimethylolpropanetriacrylate base) in the same manner as in Example 30.

The thus obtained laminate was evaluated and the results are shown in Table 10.

Example 35

The procedures as in Example 32 were repeated, but the cured polymer layer under the ITO layer was changed to the UV-cured layer as used in Example 34.

The thus obtained laminate was evaluated and the results are shown in Table 10.

Example 36

The procedures as in Example 32 were repeated, but the cured polymer layer as an anchor layer under the metal oxide layer was changed to a cured layer which was the same as the solvent resistant protecting layer in Example 24.

The thus obtained laminate was evaluated and the results are shown in Table 10.

Example 37

The procedures as in Example 32 were repeated, but a fine particles-containing layer was additionally formed on the side of the polycarbonate film opposite to the ITO layer by coating a coating solution and heating it at 130° C. for 2 minutes, the fine-particle-containing layer having a thickness of 2 μm. This coating solution was the same as the coating solution in Example 32 except that a silica powder having an average particle size of 2 μm was added in an amount of 0.4 part and the mixture was sufficiently stirred.

The thus obtained laminate was evaluated and the results are shown in Table 10.

Example 38

The procedures as in Example 37 were repeated, but the fine-particle-containing layer was prepared from a coating solution which was basically the same as the UV-curable solution in Example 34 to which 0.2 part of an acryl resin powder having an average particle size of 5 μm was added.

The thus obtained laminate was evaluated and the results are shown in Table 10.

Examples 39 to 41

The procedures as in Example 26 were repeated except for the following. For the B layer in contact with the ITO layer, a polyvinyl alcohol-based polymer (EVAl F104, manufactured by Kuraray) and the compounds as shown in Table 11 were used in the amounts as indicated in Table 11. For the another B layer (B' layer) in contact with the $SiO_x$ layer, a polyvinyl alcohol-based polymer EVAL F104 and the compounds as shown in Table 11 were used in the amounts as indicated in Table 11.

Examples 42 to 46

The procedures as in Example 9 were repeated but the compounds as shown in Table 11 were used in the amounts as indicated in Table 11.

In Table 11, the following abbreviations are used.

APMDEOS: 3-aminopropylmethyldiethoxysilane
MAPTMOS: N-methylaminopropyltrimethoxysilane
APTEOS: 3-aminopropyltriethoxysilane
AEAPTMOS: N-(2-aminoethyl)-3-aminopropyltrimethoxysilane
AEAPMDMOS: N-(2-aminoethyl)-3-aminopropylmethyldimethoxysilane

TABLE 10

| Example No. | Ex. 32 | Ex. 33 | Ex. 34 | Ex. 35 | Ex. 36 | Ex. 37 | Ex. 38 |
|---|---|---|---|---|---|---|---|
| Layer structure | | | | | | | |
| Structure | ITO/H(2)/X(200)/H(2)/TF-PC/H(2) | ITO/H(2)/XMgF$_2$(1000)/AP133(0.05)/TF-PC/H(2) | ITO/H(2)/X(200)/UV(4)/TF-PC/UV(4) | ITO/UV(4)/X(200)/H(2)/TF-PC/H(2) | ITO/H(2)/X(200)/H(2)/TF-PC/H(2) | #ITofH(2)/X(200)/A(5)/TF-PC(H(2) | ITO/H(2)/X(200)/A(2)/TF-PCIG(2) |
| Epoxysilane coupler (B1) | ECHETMOS | ECHETMOS | ECHETMOS | ECHETMOS | ECHETMOS | ECHETMOS | ECHETMOS |
| Aminosilane coupler (B2) | APTMOS | APTMOS | APTMOS | APTMOS | APTMOS | APTMOS | APTMOS |
| Polyvinyl alcohol-based polymer (B3) | E | E | E | E | E | E, E | E |
| Si content | 50 | 50 | 50 | 50 | 50 | 50, 50 | 50 |
| B1 amount | 50 | 50 | 50 | 50 | 50 | 50, 50 | 50 |
| Filler | — | — | — | — | — | —, G | — |
| Evaluations | | | | | | | |
| Transparency (%, ΔH %) | 86, 0.3 | 86, 0.4 | 86, 0.4 | 86, 0.4 | 86, 0.4 | 86, 0.6 | 86, 0.7 |
| Optical isotropy (nm) | 8 | 9 | 9 | 8 | 9 | 8 | 8 |
| Chemical resistance (1) | No change | No change | No change | No change | No change | No change | No change |
| Chemical resistance (2) | No change | No change | No change | No change | No change | No change | No change |
| Chemical resistance (3): | | | | | | | |
| Test (1) | No change | No change | No change | No change | No change | No change | No change |
| Test (2) | — | — | — | — | — | — | — |
| Test (3) | — | — | — | — | — | — | — |
| Gas barrier property (1) m$^2$ · atm · day | 0.3 | 0.1 | 0.6 | 0.8 | 0.5 | 0.3 | 0.3 |
| Adhesivity | 100/100 | 100/100 | 100/100 | 100/100 | 100/100 | 100/100 | 100/100 |
| Sliding property | — | — | — | — | — | Good without deformation | Good without deformation |

TABLE 11

| Example No. | Ex. 39 | Ex. 40 | Ex. 41 | Ex. 42 | Ex. 43 | Ex. 44 | Ex. 45 | Ex. 46 |
|---|---|---|---|---|---|---|---|---|
| Layer structure | ITO/B/PC/A/B' | ITO/B/PC/A/B' | ITO/B/PC/A/B' | B/A/PC | B/A/PC | B/A/PC | B/A/PC | B/A/PC |
| A layer: | | | | | | | | |
| Composition | $SiO_{1.7}$ | $SiO_{1.7}$ | $SiO_{1.7}$ | $SiO_{1.7}$ | $SiO_{1.7}$ | $SiO_{1.7}$ | $SiO_{1.7}$ | $SiO_{1.7}$ |
| Thickness (Å) | 200 | 200 | 200 | 200 | 200 | 200 | 200 | 200 |
| B layer Composition: | | | | | | | | |
| B1) Epoxysilane | ECHETMOS | ECHETMOS | ECHETMOS | ECHETMOS | ECHETMOS | ECHETMOS | ECHETMOS | ECHETMOS |
| B2) Aminosilane | APTMOS | APTMOS | APTMOS | APTMOS | APTMOS | APTEOS | AEAPTMOS | AEAPMD-MOS |
| B3) PVA-based polymer | EVAL-F104 | EVAL-F104 | EVAL-F104 | EVAL-F104 | EVAL-F104 | EVAL-F104 | EVAL-F104 | EVAL-F104 |
| $(B_3)/[(B_1) + (B_2)]$ | 1/2 | 1/2 | 1/2 | 1/2 | 1/2 | 1/2 | 1/2 | 1/2 |
| $(b_1)/(b_2)$ | 30/70 | 55/45 | 70/30 | 50/50 | 50/50 | 50/50 | 50/50 | 50/50 |
| Thickness (μm): | 2 | 2 | 2 | 2 | 2 | 2 | 2 | 2 |
| B' layer Composition: | | | | | | | | |
| B1) Epoxysilane | ECHETMOS | ECHETMOS | ECHETMOS | | | | | |
| B2) Aminosilane | APTMOS | APTMOS | APTMOS | | | | | |
| B3) PVA-based polymer | EVAL-F104 | EVAL-F104 | EVAL-F104 | — | — | — | — | — |
| $(B_3)/[(B_1) + (B_2)]$ | 3/1 | 1/1 | 1/3 | | | | | |
| $(b_1)/(b_2)$ | 55/45 | 55/45 | 55/45 | | | | | |
| Thickness (μm): | 2 | 2 | 2 | | | | | |
| Transparency (%, H %) | 86, 0.3 | 86, 0.4 | 86, 0.3 | 90, 0.4 | 90, 0.4 | 90, 0.3 | 89, 0.6 | 89, 0.7 |
| Optical isotropy (nm) | 8 | 8 | 9 | 8 | 9 | 8 | 9 | 9 |
| Chemical resistance (1) | No change | No change | No change | No change | No change | No change | No change | No change |
| Chemical resistance (2) | No change | No change | No change | No change | No change | No change | No change | No change |
| Chemical resistance (3): | | | | | | | | |
| Test (1) | No change | No change | No change | — | — | — | — | — |
| Test (2) | — | — | — | No change | No change | No change | No change | No change |
| Test (3) | — | — | — | No change | No change | No change | No change | No change |
| Water vapor permeability ($g/m^2$/atm/day) | 2.6 | 4.0 | 3.0 | 1.8 | 1.8 | 1.7 | 2.0 | 2.2 |
| Oxygen permeability ($cm^3/(m^2$/atm/day) | 0.8 | 0.5 | 0.9 | 1.2 | 1.2 | 0.8 | 1.3 | 1.4 |
| Adhesivity | 100/100 | 100/100 | 100/100 | 100/100 | 100/100 | 100/100 | 100/100 | 100/100 |
| Flexibility | No change | No change | No change | No change | No change | No change | No change | No change |
| Durability | No change | No change | No change | No change | No change | No change | No change | No change |

We claim:

1. A liquid crystal display element comprising two electrode substrates between which a liquid crystal layer is disposed, at least one of said electrode substrates comprising the following components:
   A) a metal oxide layer,
   B) a cured polymer layer contiguous to said metal oxide layer, said cured polymer layer being obtained from a cross-linking reaction of:
      B1) a silicon compound having epoxy and alkoxysilyl groups, a full or partial hydrolysis product thereof, a full or partial condensation product thereof, or a mixture thereof;
      B2) a silicon compound having amino and alkoxysilyl groups, a full or partial hydrolysis product thereof, a full or partial condensation product thereof, or a mixture thereof; and
      B3) a polyvinyl alcohol-based polymer;
   C) a transparent electroconductive layer; and
   D) a transparent polymer substrate with a retardation of not more than 30 nm for a wavelength of 590 nm;
   wherein said transparent electroconductive layer (C) is formed on the liquid crystal layer side of said transparent polymer substrate (D), and said combination of said metal oxide layer (A) and said cured polymer layer B) is disposed between said transparent electroconductive layer (C) and said transparent polymer substrate (D) or is disposed on a side opposite to the transparent electroconductive layer (C) of said transparent polymer substrate (D).

2. The liquid crystal display element according to claim 1, wherein said silicon compound having epoxy and alkoxysilyl groups is represented by the following formula (1):

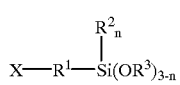

(1)

where $R^1$ is alkylene having 1 to 4 carbon atoms,
$R^2$ and $R^3$ are independently alkyl having 1 to 4 carbon atoms,
X is glycidoxy or epoxycyclohexyl, and
n is 0 or 1; and said silicon compound having amino and alkoxysilyl groups is represented by the following formula (2):

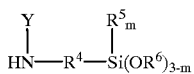

(2)

where $R^4$ is alkylene having 1 to 4 carbon atoms,
$R^5$ and $R^6$ are independently alkyl having 1 to 4 carbon atoms,
Y is hydrogen or aminoalkyl, and
m is 0 or 1.

3. The liquid crystal display element according to claim 2, wherein said silicon compound represented by the formula (1) is selected from the group consisting of 3-glycidoxypropyltrimethoxysilane and 2-(3,4-epoxycyclohexyl)ethyltrimethoxysilane, and said silicon compound represented by the formula (2) is selected from the group consisting of 3-aminopropyltrimethoxysilane, 3-aminopropyltriethoxysilane, 3-aminopropylmethyldiethoxysilane, N-methylaminopropyltrimethoxysilane, N-(2-aminoethyl)-3-aminopropyltrimethoxysilane and N-(2-aminoethyl)-3-aminopropylmethyldimethoxysilane.

4. The liquid crystal display element according to claim 1, wherein said cured polymer layer (B) is obtained from said compounds (B1) to (B3) in amounts satisfying the following formula:

$1/9 \leq (B_3)/[(B_1)+(B_2)] \leq 9/1$, by weight, and
$1/9 \leq (b_1)/(b_2) \leq 9/1$, by mole, where $B_1$ to $B_3$ stand for the amounts in weight of said compounds (B1) to (B3), respectively; $b_1$ stands for the amount of said compound (B1) based on the mole of the epoxy group thereof; and $b_2$ stands for the amount of said compound (B2) based on the total mole of the amino and imide groups thereof.

5. The liquid crystal display element according to claim 1, wherein said polyvinyl alcohol-based polymer is selected from the group consisting of polyvinyl alcohol having a degree of saponification of not less than 80%, ethylene-vinyl alcohol copolymer and polyvinyl alcohol having silyl groups in its molecule.

6. The liquid crystal display element according to claim 1, wherein said metal oxide layer comprises $SiO_x$ where $1.5 \leq x \leq 2.0$.

7. The liquid crystal display element according to claim 1, wherein said at least one electrode substrate comprises the structure of the components (C)/(B)/(A)/(D)/(B) or (B)/(A)/(D)/(B)/(C) in this order.

8. The liquid crystal display element according to claim 1, wherein said at least one electrodecsubstrate comprises the structure of the components (C)/(A)/(B)/(D)/(B) or (A)/(B)/(D)/(B)/(C) in this order.

9. The liquid crystal display element according to claim 1, wherein said at least one electrode substrate comprises the structure of the components (C)/(B)/(A)/(B)/(D)/(B) or (B)/(A)/(B)/(D)/(B)/(C) in this order.

10. The liquid crystal display element according to claim 1, wherein said transparent polymer substrate is selected from the group consisting of polycarbonate, polyarylate, polysulfone and polyethersulfone.

11. The liquid crystal display element according to claim 1, wherein
i) said cured polymer layer B) is obtained from said compounds B1) to B3) in amounts satisfying the following formula:

$1/9 \leq (B_3)/[(B_1)+(B_2)] \leq 9/1$, by weight, and $1/9 \leq (b_1)/(b_2) \leq 9/1$, by mole, where $B_1$ to $B_3$ stand for the amounts in weight of said compounds (B1) to (B3), respectively; $b_1$ stands for the amount of said compound (B1) based on the mole of the epoxy group thereof; and $b_2$ stands for the amount of said compound (B2) based on the total mole of the amino and imide groups thereof;

ii) said silicon compound represented by the formula (1) is selected from the group consisting of 3-glycidoxypropyltrimethoxysilane and 2-(3,4-epoxycyclohexyl)ethyltrimethoxysilane;

iii) said silicon compound represented by the formula (2) is selected from the group consisting of 3-aminopropyltrimethoxysilane, 3-aminopropyltriethoxysilane, 3-aminopropylmethyldiethoxysilane, N-methylaminopropyltrimethoxysilane, N-(2-aminoethyl)-3-aminopropyltrimethoxysilane and N-(2-aminoethyl)-3-aminopropylmethyldimethoxysilane;

iv) said polyvinyl alcohol-based polymer is ethyl-polyvinyl alcohol copolymer having an ethylene content of 10 to 50% by mole;

v) said metal oxide layer comprises $SiO_x$ where $1.5 \leq x \leq 2.0$; and vi) said transparent polymer substrate is selected from the group consisting of polycarbonate, polyarylate, polysulfone and polyethersulfone.

12. The liquid crystal display element according to claim 1, in which said transparent electrode substrate satisfies the following:

i) a change of haze value is not more than 1% when N-methylpyrorydone is put in contact with said cured polymer layer side of said electrode substrate at 25° C. for 10 minutes followed by cleaning with water; and ii) no deterioration when 3.5%-NaOH aqueous solution is made contact with said cured polymer layer side of said electrode substrate at 25° C. for 10 minutes followed by cleaning with water.

13. A liquid crystal display element comprising two electrode substrates between which a liquid crystal layer is disposed, at least one of said electrode substrates comprising the following components:

A) a metal oxide layer,

B) a cured polymer layer contiguous to said metal oxide layer,

C) a transparent electroconductive layer, and

D) a transparent polymer substrate with a retardation of not more than 30 nm for a wavelength of 590 nm, wherein said transparent electroconductive layer (C) is formed on the liquid crystal layer side of said transparent polymer substrate (D), and said combination of said metal oxide layer (A) and said cured polymer layer (B) is disposed between said transparent electroconductive layer (C) and said ransparent polymer substrate (D) or is disposed on a side opposite to the transparent electroconductive layer (C) of said transparent polymer substrate (D), said cured polymer layer comprising a polyvinyl alcohol-based polymer cross-linked with a unit represented by the following formula (3):

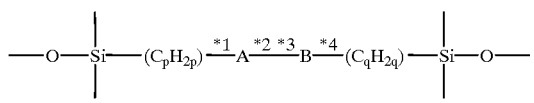
(3)

where p is an integer of 0 to 5,
q is an integer of 0 to 5;
A stands for

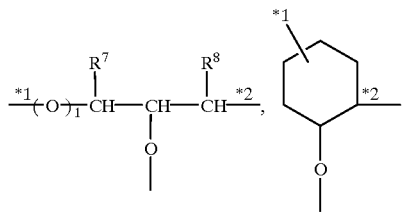

where $R^7$ and $R^8$ are independently hydrogen, methyl, ethyl or phenyl, and l is 0 or 1;
B stands for

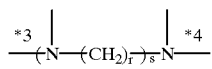

where r is an integer of 0 to 5, and s is an integer of 0 to 2; and
*2 and *3 are sites bonded each other.

14. The liquid crystal display element according to claim 13, wherein said cured polymer layer is obtained from cross-linking reaction of a silicon compound having epoxy and alkoxysilyl groups represented by the following formula (1):

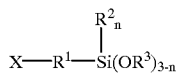
(1)

where $R^1$ is alkylene having 1 to 4 carbon atoms,
$R^2$ and $R^3$ are independently alkyl having 1 to 4 carbon atoms,
X is glycidoxy or epoxycyclohexyl, and
n is 0 or 1; and
a silicon compound having amino and alkoxysilyl groups represented by the following formula (2):

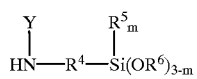
(2)

where $R^4$ is alkylene having 1 to 4 carbon atoms,
$R^5$ and $R^6$ are independently alkyl having 1 to 4 carbon atoms,
Y is hydrogen or aminoalkyl, and
m is 0 or 1.

15. A transparent electrode substrate comprising the following components:

A) a metal oxide layer,
B) a cured polymer layer contiguous to said metal oxide layer, said cured polymer layer being obtained from a cross-linking reaction of:
  B1) a silicon compound having epoxy and alkoxysilyl groups, a full or partial hydrolysis product thereof, a full or partial condensation product thereof, or a mixture thereof;
  B2) a silicon compound having amino and alkoxysilyl groups, a full or partial hydrolysis product thereof, a full or partial condensation product thereof, or a mixture thereof; and
  B3) a polyvinyl alcohol-based polymer; and
C) a transparent electroconductive layer; and
D) a transparent polymer substrate with a retardation of not more than 30 nm for a wavelength of 590 nm;
  wherein said combination of said metal oxide layer (A) and said cured polymer layer (B) is disposed between said transparent electroconductive layer (C) and said transparent polymer substrate (D) or is disposed on a side opposite to the transparent electroconductive layer (C) of said transparent polymer substrate (D).

16. The transparent electrode substrate according to claim 15, wherein said silicon compound having epoxy and alkoxysilyl groups is represented by the following formula (1):

(1)

where $R^1$ is alkylene having 1 to 4 carbon atoms,
$R^2$ and $R^3$ are independently alkyl having 1 to 4 carbon atoms,
X is glycidoxy or epoxycyclohexyl, and
n is 0 or 1; and
said silicon compound having amino and alkoxysilyl groups is represented by the following formula (2):

(2)

where $R^4$ is alkylene having 1 to 4 carbon atoms,
$R^5$ and $R^6$ are independently alkyl having 1 to 4 carbon atoms,
Y is hydrogen or aminoalkyl, and m is 0 or 1.

17. The transparent electrode substrate according to claim 16, wherein said silicon compound represented by the formula (1) is selected from the group consisting of 3-glycidoxypropyltrimethoxysilane and 2-(3,4-epoxycyclohexyl)ethyltrimethoxysilane, and said silicon compound represented by the formula (2) is selected from the group consisting of 3-aminopropyltrimethoxysilane, 3-aminopropyltriethoxysilane, 3-aminopropylmethyldiethoxysilane, N-methylaminopropyltrimethoxysilane, N-methylaminopropyltrimethoxysilane, N-(2-aminoethyl)-3-aminopropyltrimethoxysilane and N-(2-aminoethyl)-3-aminopropylmethyldimethoxysilane.

18. The transparent electrode substrate according to claim 15, wherein said cured polymer layer B) is obtained from said compounds (B1) to (B3) in amounts satisfying the following formula:

$1/9 \leq (B_3)/[(B_1)+(B_2)] \leq 9/1$, by weight, and
$1/9 \leq (b_1)/(b_2) \leq 9/1$, by mole,
where $B_1$ to $B_3$ stand for the amounts in weight of said compounds (B1) to (B3), respectively; $b_1$ stands for the amount of said compound (B1) based on the mole of the epoxy group thereof; and $b_2$ stands for the amount of said compound (B2) based on the total mole of the amino and imide groups thereof.

19. The transparent electrode substrate according to claim 15, wherein said polyvinyl alcohol-based polymer is selected from the group consisting of polyvinyl alcohol having a degree of saponification of not less than 80%, ethylene-vinyl alcohol copolymer and polyvinyl alcohol having silyl groups in its molecule.

20. The transparent electrode substrate according to claim 15, wherein said polyvinyl alcohol-based polymer is ethylene-vinyl alcohol copolymer having an ethylene content of 10 to 50% by mole.

21. The transparent electrode substrate according to claim 15, wherein said metal oxide layer comprises $SiO_x$ where $1.5 \leq x \leq 2.0$.

22. The transparent electrode substrate according to claim 15, wherein said transparent polymer substrate is selected from the group consisting of polycarbonate, polyarylate, polysulfone and polyethersulfone.

23. The transparent electrode substrate according to claim 15, which comprises the structure of the components (C)/(B)/(A)/(D)/(B) or (B)/(A)/(D)/(B)/(C).

24. The transparent electrode substrate according to claim 15, which comprises the structure of the components (C)/(A)/(B)/(D)/(B) or (A)/(B)/(D)/(B)/(C) in this order.

25. The transparent electrode substrate according to claim 15, which comprises the structure of the components (C)/(B)/(A)/(B)/(D)/(B) or (B)/(A)/(B)/(D)/(B)/(C) in this order.

26. The transparent electrode substrate according to claim 15, wherein one of said metal oxide layer (A), said cured polymer layer (B) and said transparent electroconductive layer (C) is disposed on said transparent polymer substrate (D), between which an anchor layer (α) selected from the group consisting of a silane coupler, a thermoplastic resin, a radiation-curable resin and a heat-curable resin is further disposed.

27. The transparent electrode substrate according to claim 15, wherein
   i) said cured polymer layer (B) is obtained from said compounds (B1) to (B3) used in amounts satisfying the following:
   $1/9 \leq (B_3)/[(B_1)+(B_2)] \leq 9/1$, by weight, and
   $1/9 \leq (b_1)/(b_2) \leq 9/1$, by mole,
   where $B_1$ to $B_3$ stand for the amounts in weight of said compounds (B1) to (B3), respectively; $b_1$ stands for the amount of said compound (B1) based on the mole of the epoxy group thereof; and $b_2$ stands for the amount of said compound (B2) based on the total mole of the amino and imide groups thereof;
   ii) said silicon compound represented by the formula (1) is selected from the group consisting of 3-glycidoxypropyltrimethoxysilane and 2-(3,4-epoxycyclohexyl) ethyltrimethoxysilane;
   iii) said silicon compound represented by the formula (2) is selected from the group consisting of 3-aminopropyltrimethoxysilane, 3-aminopropyltriethoxysilane, 3-aminopropylmethyldiethoxysilane, N-methylaminopropyltrimethoxysilane, N-(2-aminoethyl)-3-aminopropyltrimethoxysilane and N-(2-aminoethyl)-3-aminopropyldimethoxysilane;
   iv) said polyvinyl alcohol-based polymer is ethyl-polyvinyl alcohol copolymer having an ethylene content of 10 to 50% by mole;
   v) said metal oxide layer comprises $SiO_x$ where $1.5 \leq x \leq 2.0$; and
   vi) said transparent polymer substrate is selected from the group consisting of polycarbonate, polyarylate, polysulfone and polyethersulfone.

28. The transparent electrode substrate according to claim 15, which satisfies the following:
   i) a change of haze value is not more than 1% when N-methylpyrorydone is put in contact with said cured polymer layer side of said transparent electrode substrate at 25° C. for 10 minutes followed by cleaning with water; and
   ii) no deterioration when 3.5%-NaOH aqueous solution is put in contact with said cured polymer layer side of said transparent electrode substrate at 25° C. for 10 minutes followed by cleaning with water.

29. A transparent electrode substrate comprising the following components:
   A) a metal oxide layer,
   B) a cured polymer layer contiguous to said metal oxide layer,
   C) a transparent electroconductive layer, and
   D) a transparent polymer substrate with a retardation of not more than 30 nm for a wavelength of 590 nm, wherein said combination of said metal oxide layer A) and said cured polymer layer (B) is disposed between said transparent electroconductive layer (C) and said transparent polymer substrate (D) or is disposed on a side opposite to the transparent electroconductive layer (C) of said transparent polymer substrate (D),
   said cured polymer layer comprising a polyvinyl alcohol-based polymer cross-linked with a unit represented by the following formula (3):

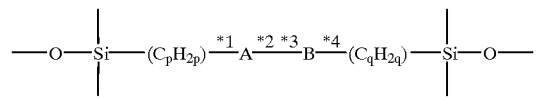

where p is an integer of 0 to 5,
q is an integer of 0 to 5;
A stands for

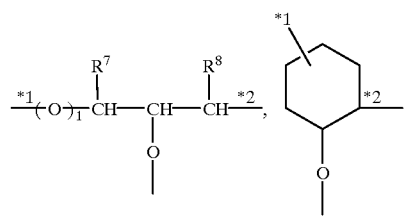

where $R^7$ and $R^8$ are independently hydrogen, methyl, ethyl or phenyl, and l is 0 or B stands for

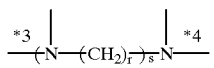

where r is an integer of 0 to 5, and s is an integer of 0 to 2; and

*2 and *3 are sites bonded each other.

30. The transparent electrode substrate according to claim 29, wherein said cured polymer layer is obtained from cross-linking reaction of a silicon compound having epoxy and aikoxysilyl groups represented by the following formula (1):

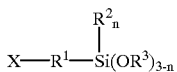
(1)

where $R^1$ is alkylene having 1 to 4 carbon atoms, $R^2$ and $R^3$ are independently alkyl having 1 to 4 carbon atoms, X is glycidoxy or epoxycyclohexyl, and n is 0 or 1; and a silicon compound having amino and alkoxysilyl groups represented by the following formula (2):

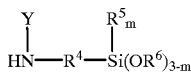
(2)

where $R^4$ is alkylene having 1 to 4 carbon atoms, $R^5$ and $R^6$ are independently alkyl having 1 to 4 carbon atoms, Y is hydrogen or aminoalkyl, and m is 0 or 1.

31. An article comprising:

D) a substrate; and

B) a cured polymer layer formed on a surface of said substrate, said cured polymer layer being obtained from a cross-linking reaction of:

B1) a silicon compound having epoxy and alkoxysilyl groups, a full or partial hydrolysis product thereof, a full or partial condensation product thereof or a mixture thereof;

B2) a silicon compound having amino and alkoxysilyl groups, a full or partial hydrolysis product thereof, a full or partial condensation product thereof or a mixture thereof; and B3) a polyvinyl alcohol-based polymer.

32. The article according to claim 31, which further comprises:

A) a metal oxide layer contiguous to said cured polymer layer.

33. The article according to claim 31, wherein said substrate is made of a resin.

34. The article according to claim 31, wherein said silicon compound having epoxy and alkoxysilyl groups is represented by the following formula (1):

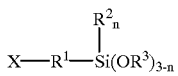
(1)

where $R^1$ is alkylene having 1 to 4 carbon atoms, $R^2$ and $R^3$ are independently alkyl having 1 to 4 carbon atoms, X is glycidoxy or epoxycyclohexyl, and n is 0 or 1; and said silicon compound having amino and alkoxysilyl groups is represented by the following formula (2):

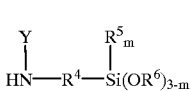
(2)

where $R_4$ is alkylene having 1 to 4 carbon atoms, $R^5$ and $R^6$ are independently alkyl having 1 to 4 carbon atoms, Y is hydrogen or aminoalkyl, and m is 0 or 1.

35. The article according to claim 31, wherein i) said cured polymer layer (B) is obtained from said compounds (B1) to (B3) in amounts satisfying the following formula:
$1/9 \leq (B_3)/[(B_1)+(B_2)] \leq 9/1$, by weight, and
$1/9 \leq (b_1)/(b_2) \leq 9/1$, by mole, where $B_1$ to $B_3$ stand for the amounts in weight of said compounds (B1) to (B3), respectively; $b_1$ stands for the amount of said compound (B1) based on the mole of the epoxy group thereof; and $b_2$ stands for the amount of said compound (B2) based on the total mole of the amino and imide groups thereof;

ii) said silicon compound represented by the formula (1) is selected from the group consisting of 3-glycidoxypropyltrimethoxysilane and 2-(3,4-epoxycyclohexyl)ethyltrimethoxysilane;

iii) said silicon compound represented by the formula (2) is selected from the group consisting of 3-aminopropyltrimethoxysilane, 3-aminopropyltriethoxysilane, 3-aminopropylmethyldiethoxysilane, N-methylaminopropyltrimethoxysilane, N-(2-aminoethyl)-3-aminopropyltrimethoxysilane and N-(2-aminoethyl)-3-aminopropylmethyldimethoxysilane;

iv) said polyvinyl alcohol-based polymer is ethyl-polyvinyl alcohol copolymer having an ethylene content of 10 to 50% by mole; and v) said article further comprises a metal oxide layer contiguous to said cured polymer layer, said metal oxide layer comprising $SiO_x$ where $1.5 \leq x \leq 2.0$.

36. The article according to claim 31, which satisfies the following:

i) a change of haze value is not more than 1% when N-methylpyrorydone is put in contact with said cured polymer layer side of said article at 25° C. for 10 minutes followed by cleaning with water;

ii) no deterioration when 3.5%-NaOH aqueous solution is put in contact with said cured polymer layer side of said article at 25° C. for 10 minutes followed by cleaning with water; and iii) no deterioration when 5.0%-HCl aqueous solution is put in contact with said cured polymer layer side of said article at 25° C. for 10 minutes followed by cleaning with water.

37. A polymer substrate comprising:
A) a metal oxide layer,
B) a cured polymer layer obtained from a cross-linking reaction of:
  B1) a silicon compound having epoxy and alkoxysilyl groups, a full or partial hydrolysis product thereof, a full or partial condensation product thereof, or a mixture thereof;
  B2) a silicon compound having amino and alkoxysilyl groups, a full or partial hydrolysis product thereof, a full or partial condensation product thereof, or a mixture thereof; and
  B3) a polyvinyl alcohol-based polymer; and
D) a transparent polymer substrate with a retardation of not more than 30 nm for a wavelength of 590 nm;
wherein said metal oxide layer (A) and said cured polymer layer (B) are contiguous with each other.

38. The polymer substrate according to claim 37, which satisfies the following:
  i) an oxygen permeation at 40° C. and 90%RH of not more than 10 cm$^3$/m$^2$/day/atm.
  ii) a change of haze value is not more than 1% when N-methylpyrorydone is put in contact with said cured polymer layer side of said polymer substrate at 25° C. for 10 minutes followed by cleaning with water;
  iii) no deterioration when 3.5%-NaOH aqueous solution is made contact with said cured polymer layer side of said polymer substrate at 25° C. for 10 minutes followed by cleaning with water; and
  iv) no deterioration when 5.0%-HCl aqueous solution is made contact with said cured polymer layer side of said polymer substrate at 25° C. for 10 minutes followed by cleaning with water.

39. A polymer substrate comprising:
D) a transparent polymer substrate with a retardation of not more than 30 nm for a wavelength of 590 nm;
A) a metal oxide layer formed on a first side of said transparent polymer substrate;
B-1) a first cured polymer layer contiguous to said metal oxide layer, said cured polymer layer being obtained from a cross-linking reaction of:
  B1) a silicon compound having epoxy and alkoxysilyl groups, a full or partial hydrolysis product thereof, a full or partial condensation product thereof, or a mixture thereof;
  B2) a silicon compound having amino and alkoxysilyl groups, a full or partial hydrolysis product thereof, a full or partial condensation product thereof, or a mixture thereof; and
  B3) a polyvinyl alcohol-based polymer; and
B-2) a second cured polymer layer on a second side of said transparent polymer substrate opposite to said first side, said cured polymer layer being obtained from a cross-linking reaction of:
  B1) a silicon compound having epoxy and alkoxysilyl groups, a full or partial hydrolysis product thereof, a full or partial condensation product thereof, or a mixture thereof;
  B2) a silicon compound having amino and alkoxysilyl groups, a full or partial hydrolysis product thereof, a full or partial condensation product thereof, or a mixture thereof; and
  B3) a polyvinyl alcohol-based polymer.

40. A process for producing a coated article, comprising the steps of:
a) preparing a coating composition which comprises:
  B1) a silicon compound having epoxy and alkoxysilyl groups, a full or partial hydrolysis product thereof, a full or partial condensation product thereof or a mixture thereof;
  B2) a silicon compound having amino and alkoxysilyl groups, a full or partial hydrolysis product thereof, a full or partial condensation product thereof or a mixture thereof;
  B3) a polyvinyl alcohol-based polymer;
  B4) a carboxylic acid;
  B5) an organic solvent; and
  B6) water;
b) coating a substrate with said coating composition; and
c) curing said coating composition by cross-linking reaction between said compound B1) to B3) to form a cured polymer layer on said substrate.

41. The process according to claim 40, which further comprises the step of forming a metal oxide layer.

42. The process according to claim 41, which further comprises the step of forming a transparent electroconductive layer.

* * * * *